United States Patent [19]

Hashimoto et al.

[11] Patent Number: 5,583,615
[45] Date of Patent: Dec. 10, 1996

[54] COMMUNICATION CONTROL DEVICE FOR AN IMAGE FORMING APPARATUS SUPERVISING SYSTEM

[75] Inventors: Yasunari Hashimoto, Tokyo; Yasuo Kawada, Kawasaki; Kazuyuki Nakahara, Toyonaka; Osamu Kizaki, Asaka; Tomofumi Harada, Yokohama; Nobuaki Tomidokoro, Sagamihara, all of Japan

[73] Assignee: Ricoh Company, Ltd., Tokyo, Japan

[21] Appl. No.: 159,480

[22] Filed: Nov. 30, 1993

[30] Foreign Application Priority Data

Nov. 30, 1992 [JP] Japan ................................ 4-321044
Dec. 25, 1992 [JP] Japan ................................ 4-347139
Jun. 30, 1993 [JP] Japan ................................ 5-162210

[51] Int. Cl.[6] ................................................ G03G 21/00
[52] U.S. Cl. ........................................ 355/204; 355/205
[58] Field of Search ............................ 355/202, 203, 355/205, 206, 208, 204; 379/106; 364/187

[56] References Cited

U.S. PATENT DOCUMENTS

| | | | |
|---|---|---|---|
| 4,583,834 | 4/1986 | Seko et al. | |
| 5,220,380 | 6/1993 | Hirata et al. | 355/204 |
| 5,270,775 | 12/1993 | Suzuki | 355/204 |
| 5,282,127 | 1/1994 | Mii | 355/206 X |
| 5,333,286 | 7/1994 | Weinberger et al. | 355/205 X |
| 5,359,391 | 10/1994 | Kuroyanagi et al. | 355/204 |
| 5,369,471 | 11/1994 | Yamada | 355/208 |

FOREIGN PATENT DOCUMENTS

| | | |
|---|---|---|
| 0309966 | 4/1989 | European Pat. Off. . |
| 0509528 | 10/1992 | European Pat. Off. . |
| 0525745 | 2/1993 | European Pat. Off. . |
| 3921617 | 1/1990 | Germany . |
| 3-252671 | 11/1991 | Japan . |
| 4-256968 | 9/1992 | Japan . |

Primary Examiner—Nestor R. Ramirez
Attorney, Agent, or Firm—Oblon, Spivak, McClelland, Maier & Neustadt, P.C.

[57] ABSTRACT

A communication control device connected between an image forming apparatus and a communication line in an image forming apparatus supervising system which connects the image forming apparatus and a host machine by the communication line. Assume that particular data of an image forming apparatus and which is updated day by day should be read periodically. Then, even when the power supply to the image forming apparatus is shut off, a host machine can access the apparatus to read the data which should be read periodically, and receive it. In addition, the data can be preserved until the next time for reading. The data is stored in a first memory until the data is ready for transfer to the host machine, at which time the data is transferred to a second memory and then to the host machine.

34 Claims, 49 Drawing Sheets

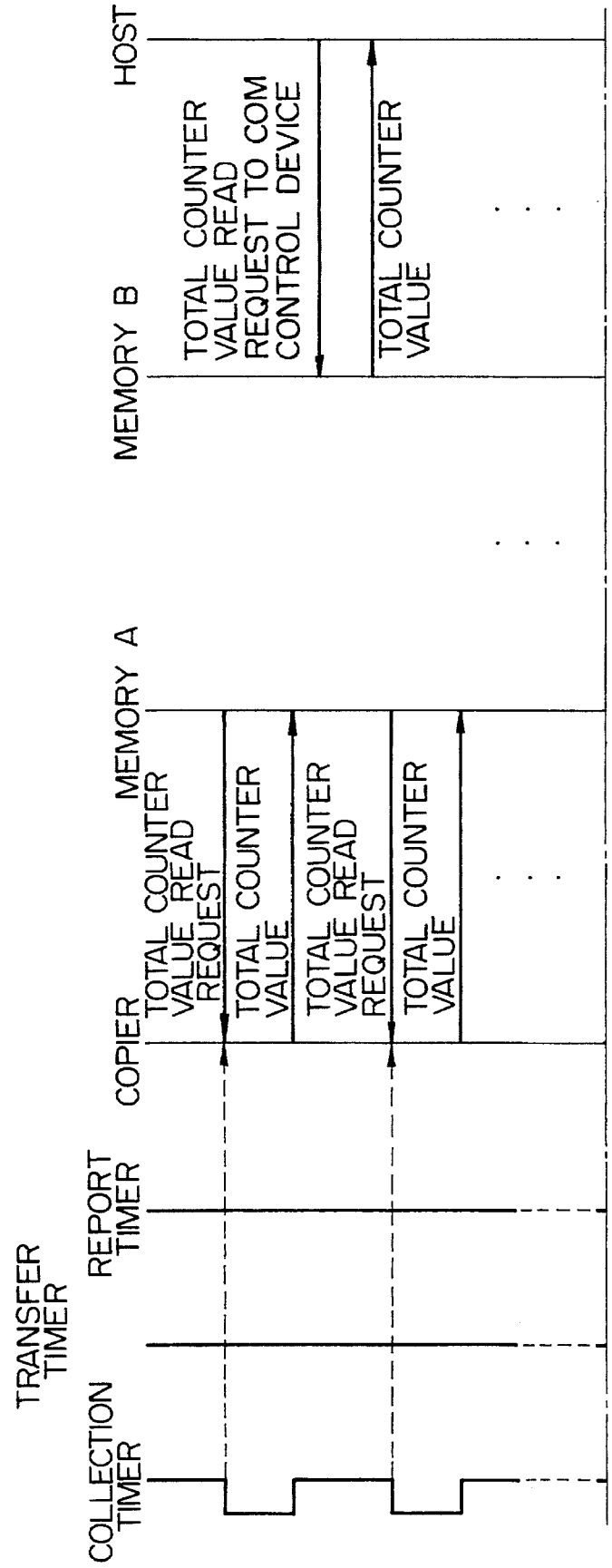

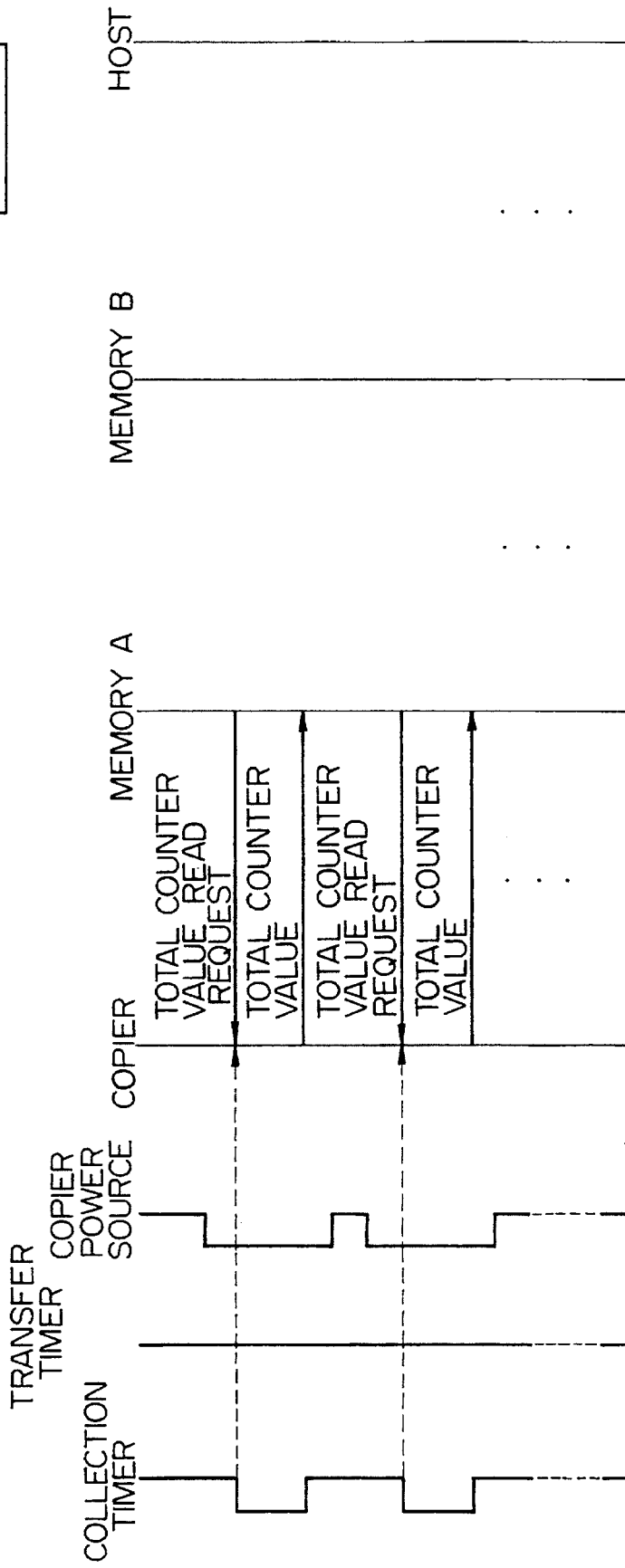

Fig. 14

| Fig. 14A |
|---|
| Fig. 14B |

Fig.14A

| | PARAMETERS | DATA LENGTH |
|---|---|---|
| COPIER WITH ADDRESS 1 | TYPE NO. | 6 |
| | SERIAL NO. | 10 |
| | CHECKSUM | 4 |
| COPIER WITH ADDRESS 2 | TYPE NO. | 6 |
| | SERIAL NO. | 10 |
| | CHECKSUM | 4 |
| COPIER WITH ADDRESS 3 | TYPE NO. | 6 |
| | SERIAL NO. | 10 |
| | CHECKSUM | 4 |
| COPIER WITH ADDRESS 4 | TYPE NO. | 6 |
| | SERIAL NO. | 10 |
| | CHECKSUM | 4 |
| COPIER WITH ADDRESS 5 | TYPE NO. | 6 |
| | SERIAL NO. | 10 |
| | CHECKSUM | 4 |
| REMOTE REPORT DUE TO KEY | DESTINATION'S PHONE NUMBER | 32 |
| | NUMBER OF REDIALING | 2 |
| | INTERVAL OF REDIALING | 3 |
| | PERMIT/INHIBIT TRANSMISSION TO HOST | 1 |
| | NUMBER OF JAM | 1 |
| | NUMBER OF SELF-DIAGNOSIS ERRORS | 1 |
| | NUMBER OF COPIES | 1 |
| | STATES OF COPIER | 1 |
| | CHECKSUM | 4 |

Fig. 14B

| | | | |
|---|---|---|---|
| REMOTE REPORT DUE TO SELF-DIAGNOSIS ERROR | DESTINATION'S PHONE NUMBER | | 32 |
| | NUMBER OF REDIALING | | 2 |
| | INTERVAL OF REDIALING | | 3 |
| | PERMIT/INHIBIT TRANSMISSION TO HOST | NUMBER OF JAM | 1 |
| | | NUMBER OF SELF-DIAGNOSIS ERRORS | 1 |
| | | NUMBER OF COPIES | 1 |
| | | STATES OF COPIES | 1 |
| | CHECKSUM | | 4 |
| REMOTE REPORT FOR PRECAUTION | DESTINATION'S PHONE NUMBER | | 32 |
| | NUMBER OF REDIALING | | 2 |
| | INTERVAL OF REDIALING | | 3 |
| | PERMIT/INHIBIT TRANSMISSION TO HOST | NUMBER OF JAM | 1 |
| | | NUMBER OF SELF-DIAGNOSIS ERRORS | 1 |
| | | NUMBER OF COPIES | 1 |
| | | STATES OF COPIES | 1 |
| | TIME OF REPORT TO HOST (HR:MIN) | | 4 |
| | CHECKSUM | | 4 |
| AUTO TOTAL COUNTER VALUE COM | COLLECTION TIME OF TOTAL COPY NUMBER COUNTER VALUES | | 4 |
| | DESTINATION'S PHONE NUMBER | | 32 |
| | DATE OF REPORT (DATE:MIN) | | 6 |
| | CHECKSUM | | 4 |
| PHONE SETTING | DIAL MODE (PULSE OR TONE) | | 1 |
| | DIAL PULSE INTERVAL | | 1 |
| | CHECKSUM | | 4 |

Fig. 15A
DATA FROM COPIER TO COM CONTROL DEVICE

| REASON CODE | NUMBER OF JAM | | | NUMBER OF SELF-DIAGNOSIS ERRORS | | | | NUMBER OF COPIES | | | | STATE OF COPIER | | | |
|---|---|---|---|---|---|---|---|---|---|---|---|---|---|---|---|
| | TOTAL | POSITION A | POSITION B | ... | TOTAL | KIND A | KIND B | ... | TOTAL | SIZE A | SIZE B | ... | STATE A | STATE B | STATE C | ... |

Fig. 15B
DATA FROM COM CONTROL UNIT TO HOST

| TYPE NO. | SERIAL NO. | REASON CODE | NUMBER OF SELF-DIAGNOSIS ERRORS | | | | STATE OF COPIER | | | | TIME |
|---|---|---|---|---|---|---|---|---|---|---|---|
| | | | TOTAL | KIND A | KIND B | ... | STATE A | STATE B | STATE C | ... | |

Fig. 15C
RESULT FROM COM CONTROL DEVICE TO COPIER

| RESULT CODE | CONTENT OF RESULT |
|---|---|

SPECIFIC REMOTE REPORT DATA FORMAT

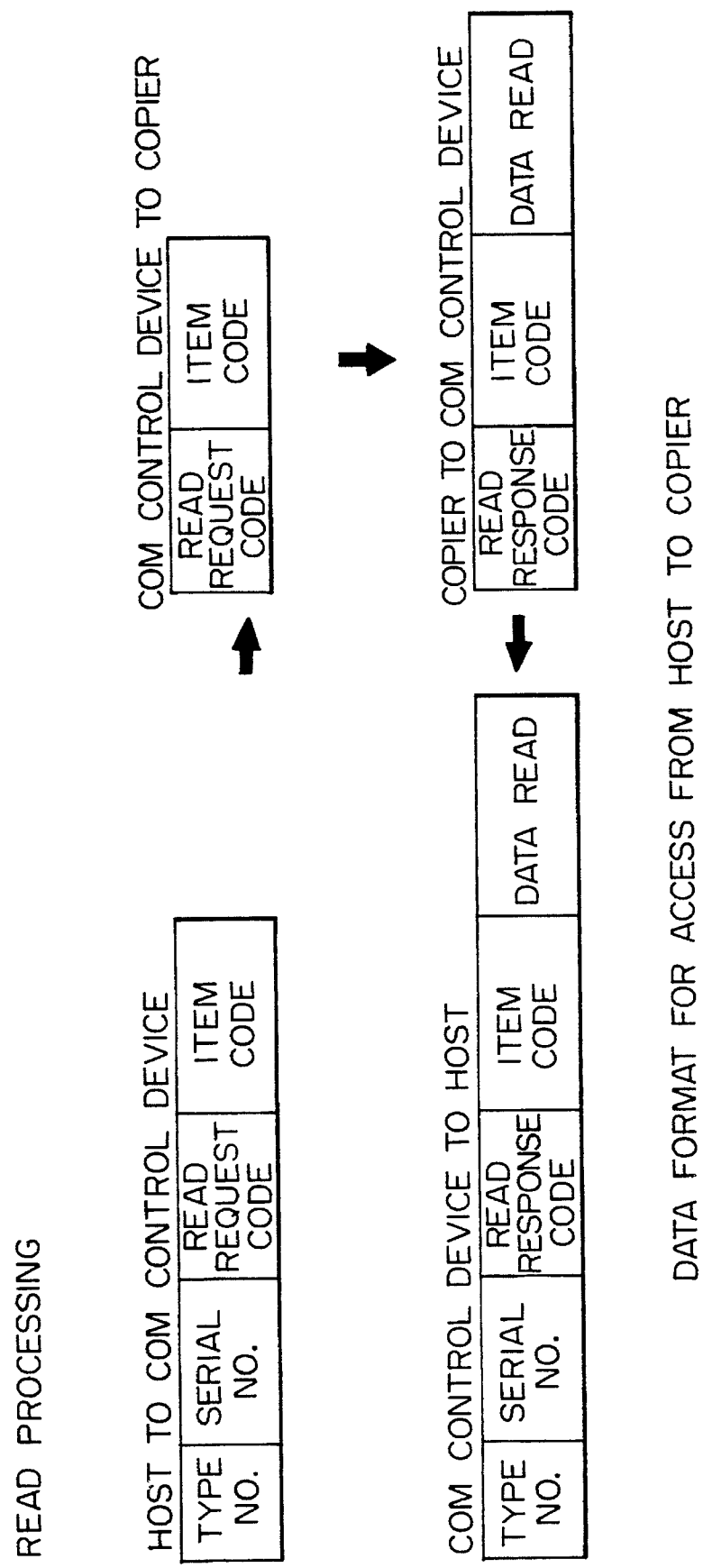

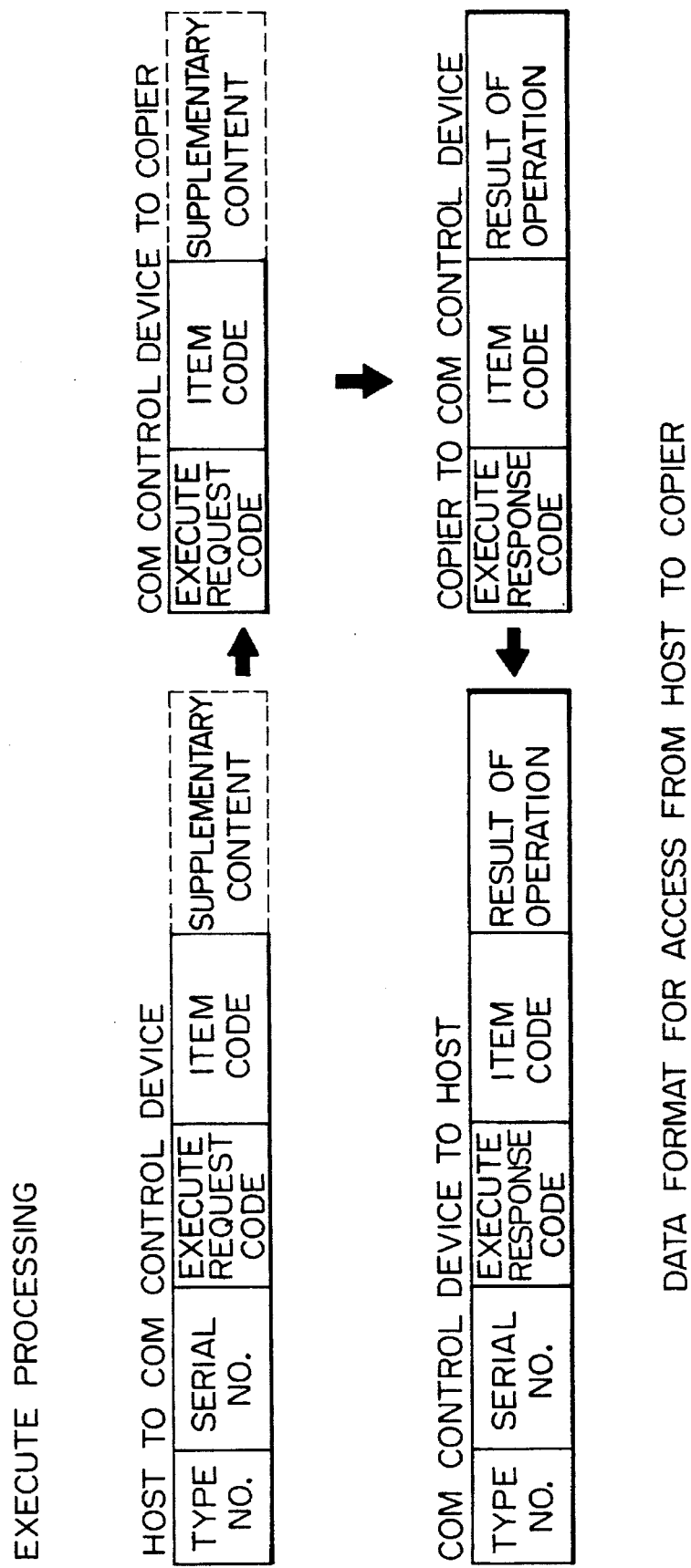

Fig. 19A
READ PROCESSING

ACCESS TO COM CONTROL DEVICE

| COM CONTROL DEVICE CODE | READ REQUEST CODE | ITEM CODE |
|---|---|---|

RESPONSE FROM COM CONTROL DEVICE

| COM CONTROL DEVICE CODE | READ RESPONSE CODE | ITEM CODE | DATA READ |
|---|---|---|---|

Fig. 19B
WRITE PROCESSING

ACCESS TO COM CONTROL DEVICE

| COM CONTROL DEVICE CODE | WRITE REQUEST CODE | ITEM CODE | DATA TO WRITE |
|---|---|---|---|

RESPONSE FROM COM CONTROL DEVICE

| COM CONTROL DEVICE CODE | WRITE RESPONSE CODE | ITEM CODE | DATA WRITTEN |
|---|---|---|---|

Fig. 19C
EXECUTE PROCESSING

ACCESS TO COM CONTROL DEVICE

| COM CONTROL DEVICE CODE | EXECUTE REQUEST CODE | ITEM CODE | SUPPLEMENTARY CONTENT |
|---|---|---|---|

RESPONSE FROM COM CONTROL DEVICE

| COM CONTROL DEVICE CODE | EXECUTE RESPONSE CODE | ITEM CODE | RESULT OF OPERATION |
|---|---|---|---|

Fig. 20
ACCESS FROM COM CONTROL DEVICE TO COPIER
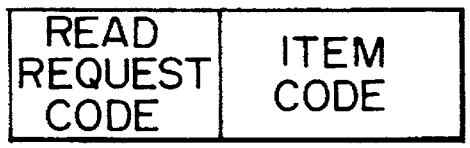
RESPONSE FROM COPIER TO COM CONTROL DEVICE
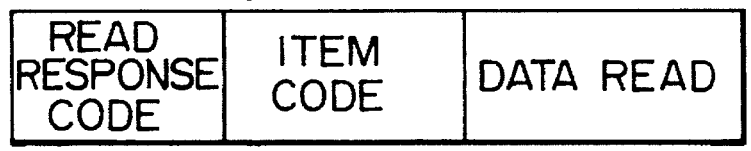
DATA FORMAT FOR ACCESS FROM COM CONTROL DEVICE TO COPIER

COMMUNICATION CONTROL DEVICE FOR AN IMAGE FORMING APPARATUS SUPERVISING SYSTEM

BACKGROUND OF THE INVENTION

1. Field of the Invention

The present invention relates to an image forming apparatus supervising system connecting an image forming apparatus and a host machine via a communication line and, more particularly, to a communication control device connected between the image forming apparatus and the communication line for controlling their communication.

2. Discussion of the Background

An image forming apparatus supervising system of the type described may connect a plurality of copiers or similar image forming apparatuses to a host machine located at, for example, a remote service center over a switched telephone network or similar communication line. This kind of system is disclosed in Japanese Patent Laid-Open Publication (Kokai) Nos. 257155/1990, 259666/1990, and 196053/1991 by way of example. In such a system, a single host machine controls a plurality of remote image forming apparatuses collectively so as to add up the conditions of the individual apparatuses relating to use and to effect maintenance. The conditions relating to use include the number of copies produced. Regarding maintenance, each image forming apparatus may call the host machine automatically after self-diagnosis, or the host machine may access the individual apparatuses to adjust various portions thereof. Today, it is a common practice with this kind of system to read a counter (generally the number of copies produced) built in each image forming apparatus by remote control, thereby charging the user of the apparatus for a maintenance contract.

However, the problem with the conventional supervising system is that even when the image forming apparatus and the host machine are connected by a communication line, the host machine cannot read the above-mentioned particular data out of the apparatus if the power supply to the apparatus is shut off. As a result, the time when the host machine can read the data is limited. For example, although the host machine should preferably read the data out of the image forming apparatus at nighttime during which communication cost is low and traffic is light, i.e., a high connection rate is achievable, the power supply to the apparatus is often shut off at nighttime.

SUMMARY OF THE INVENTION

It is, therefore, an object of the present invention to provide a communication control device for an image forming apparatus supervising system which allows particular data to be sent from an image forming apparatus to a host machine even when the power supply to the apparatus is shut off.

In accordance with the present invention, a communication control device connected between an image forming apparatus and a communication line in an image forming apparatus supervising system which connects the image forming apparatus and a host machine by the communication line comprises a particular data receiving section for receiving particular data from the image forming apparatus periodically, a first storage for storing the particular data received by the particular data receiving section, and a second storage for storing the particular data transferred from the first storage. The device is capable of reading the particular data out of the second storage when connected to the host machine via the communication line.

Also, in accordance with the present invention, a communication control device connected between an image forming apparatus and a communication line in an image forming apparatus supervising system of the type described comprises a particular data receiving section for receiving particular data from the image forming apparatus periodically, a first storage for storing the particular data received by the particular data receiving section, a second storage for storing the particular data transferred from the first storage, and a transmitting section for sending the particular data stored in the second storage to the host machine periodically.

BRIEF DESCRIPTION OF THE DRAWINGS

The above and other objects, features and advantages of the present invention will become more apparent from the following detailed description taken with the accompanying drawings in which:

FIG. 14 is a table listing parameters set in the communication control device shown in FIG. 5;

FIGS. 15A–15C each show a particular data format to be sent by a remote report;

FIGS. 16, 17 and 18 show respectively a read process data format, a write process data format, and an execute process data format with which the host machine of FIG. 4 can access the copier;

FIG. 19A–19C each show a specific data format with which the host machine can access the communication control device;

FIG. 20 shows a specific data format for implementing the access from the communication control device to the copier;

DESCRIPTION OF THE PREFERRED EMBODIMENT

Figure 1:
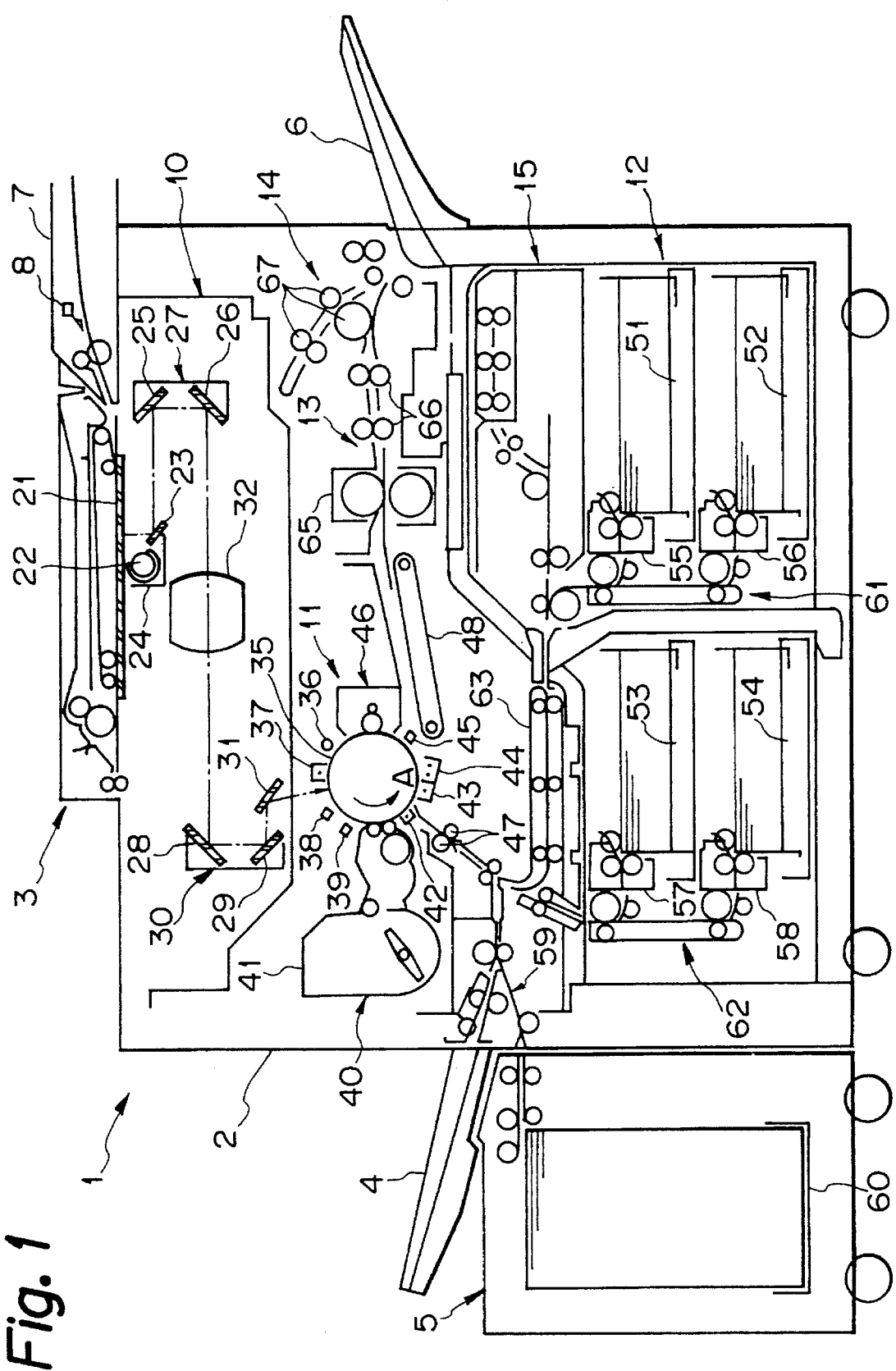
FIG. 1 is a section of a belonging to a family of image forming apparatuses to which the present invention is applicable.

Referring to FIG. 1 of the drawings, an image forming apparatus to which a control system implemented with the present invention is applicable is shown and implemented as a copier by way of example. As shown, the copier, generally 1, is an electrophotographic plain paper copier (PPC) and is generally made up of a copier body 2 and an automatic document feeder (ADF) 3 mounted on the top of the body 2. A tray 4 for manual paper insertion and a mass paper feed unit 5 are provided on one side of the copier body 2, while a copy tray 6 is provided on the other side. A document tray 7 is provided on the ADF 3 and includes a document set sensor 8. Arranged in the copier body 2 are a scanner section 10, an image forming section 11, a paper feed section 12, an image fixing and paper discharging section 13, a paper turning section 14, a two-sided copy unit 15, etc.

The scanner section 10 has a glass platen 21, a first scanner 24 made up of a lamp 22 and a first mirror 23, a second scanner 27 made up of a second mirror 25 and a third mirror 26, a third scanner 30 made up of a fourth mirror 28 and a fifth mirror 29, a sixth mirror 31, and a lens 32. The image forming section 11 includes a photoconductive drum 35. Arranged around the drum 35 are a quenching lamp 36, a main charger 37, an eraser 38, a potential sensor 39, a developing unit 40 on which a toner cartridge 41 is removably mounted, a pretransfer charger 42, a transfer charger 43, a paper separation charger 44, a photosensor or P sensor, as sometimes referred to hereinafter, 45, and a cleaning unit 46. A registration roller pair 47 is located on a paper transport path upstream of an image transfer position, while a transport belt 48 is located on the transport path downstream of the image transfer position.

The paper feed section 12 has a first to a fourth removable tray 51–54 each being loaded with a stack of papers of particular size. A first to a fourth pick-up paper feed units 55–58 are associated with the trays 51–54, respectively. Likewise, a paper feed unit 59 is associated with the manual paper tray 4 and a large capacity tray (LCT) 60. A right transport section 61, a left transport section and a horizontal transport section 63 are provided for transporting papers selectively fed out of the units 55–59 and 15 toward the registration roller pair 46. The fixing and discharging section 13 has a fixing unit 65 and a group of discharge rollers 66. The paper turning section has a group of turn-over rollers 67.

The operation of the copier 1 will be outlined hereinafter. The drum 35 is mounted on a shaft, not shown, and rotatable in a direction indicated by an arrow A in the figure in response to a copy command or similar command. A document fed to the glass platen 21 by the ADF 3 is scanned by the first scanner 24. The resulting imagewise reflection from the document is focused onto the drum 35 via the mirrors 23, 25 and 26, lens 32, and mirrors 29 and 31. The surface of the drum 35 has been charged by the main charger 37 beforehand. As a result, a latent image representative of the document is electrostatically formed on the drum 35. The eraser 38 illuminates needless portions of the drum 35 so as to trim the latent image such that it is suitable for a paper or a projection image. To reproduce the document in a 1:1 magnification, the drum 35 and the first scanner 24 are driven at the same speed as each other. The developing unit 40 develops the latent image to produce a corresponding toner image. At this instant, a potential (bias voltage for development) is applied to the developing unit 40 to render a dark image or a light image, as desired.

A paper is fed from a desired one of the trays 51–54, 4 and 60 and two-sided copy unit 15 by associated one of the feed units 55–59 at a predetermined timing. The paper is routed through the right transport section 61, the left transport section 62, the horizontal transport section 63 and so forth toward the register roller pair 47 which are held in a stop then. The register roller pair 47 is driven at such a timing that the leading edge of the paper meets the leading edge of the toner image carried on the drum 35. As a result, the toner image is transferred from the drum 35 to the paper by the pretransfer charger 42 and transfer charger 43. At this instant, since the surface of the drum 35 is extremely smooth and causes the paper to adhere closely thereto, the separation charger 44 lowers the potential and, therefore, the adhesion of the paper.

After the paper has been separated from the drum 35 by a separator, not shown, it is transported to the fixing unit 65 by the transport belt 48. The fixing unit 37 fixes the toner image on the paper by heat and pressure. Finally, the paper, or copy, is driven out to the copy tray 6 by the discharge rollers 66. In a two-sided copy mode, the paper carrying the image on one side thereof is driven into the turning section 14, turned over, and then delivered to the two-sided copy unit 15. This paper is refed from the unit 15 to the image forming section 11 when the next document image is to be reproduced. After the image transfer, a brush and a blade included in the cleaning unit 46 remove the toner remaining on the surface of the drum 35. Subsequently, the quenching lamp 36 regularizes the surface potential of the drum 35. A control circuit, which will be described, controls the procedure described above mainly in response to pulses synchronous to the rotation of the drum 35 or reference pulses used to drive the drum 35.

Figure 2:
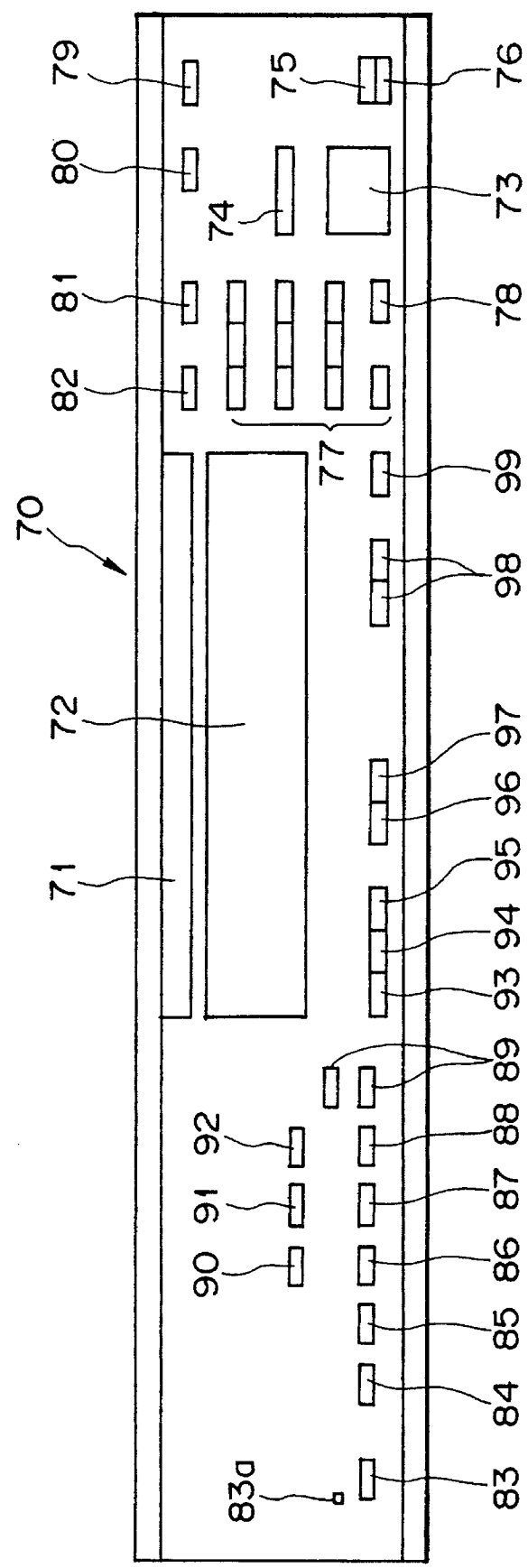
FIG. 2 shows a specific layout of a display and operation board provided on the copier of FIG. 1.

FIG. 2 shows a specific configuration of an operation and display board 70 provided on the copier. As shown, the board 70 includes a guidance display 71 and a pattern display 72 which are located at the center and implemented by LCD (Liquid Crystal Display) panels. A number of keys are arranged at both sides and in front of the displays 71 and 72. Specifically, a start key 73, an interrupt key 74, a preheat key 75, a mode clear/preheat key 76, numeral keys 77, a clear/stop key 78, a timer key 79, a program key 80, an enter key 81, and a guidance key 82 are located at the right-hand side. A remote report key 83, a sorter key 84, a two-side key 85, a page continuous key 86, an erase key 87, a paper priority magnification change key 88, a zoom key 89, a margin adjust key 90, a center key 91 and a size priority magnification key 92 are also provided. Arranged in front of the displays 71 and 72 are a reduce key 93, an enlarge key 94, an 1:1 key 95, a paper select key 96, an auto paper select key 97, a density adjust key 98, and an auto density key 99. When the remote report key 83 is pressed to effect a remote report, an indicator, or LED (Light Emitting Diode) 83a is turned on.

Figure 3:
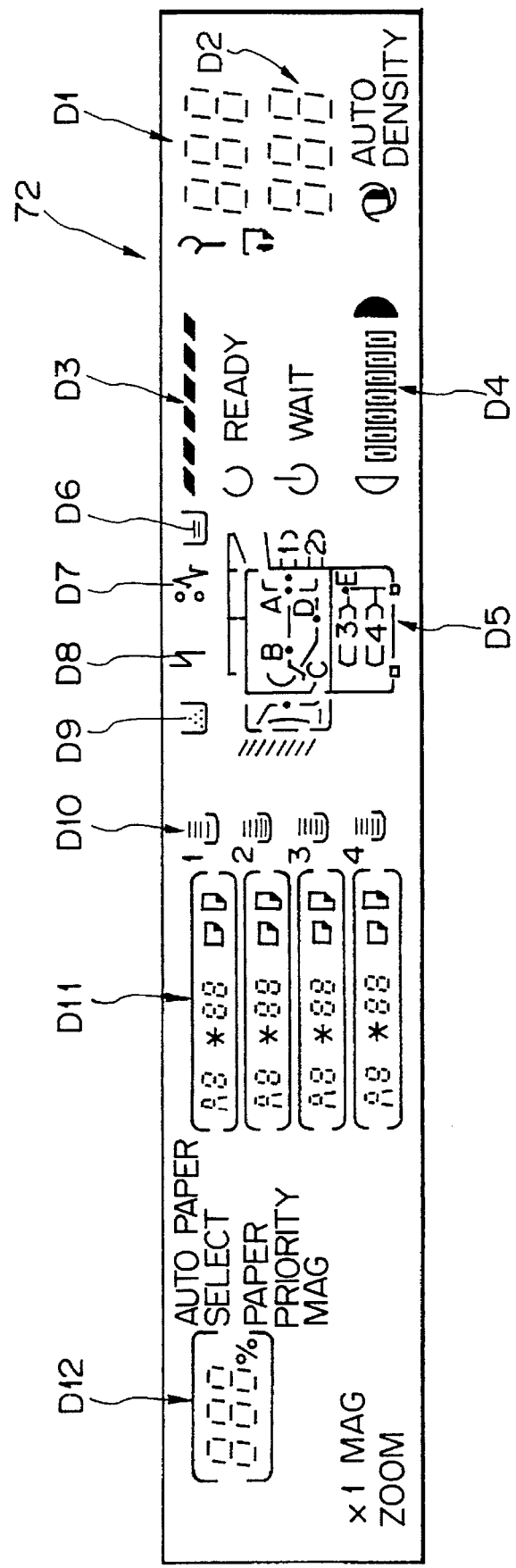
FIG. 3 is a fragmentary enlarged view of the display and operation board.

FIG. 3 shows the pattern display 72 in an enlarged scale. As shown, a number of copies set D1, a number of copies produced D2, a running state D3, a density D4, a misfeed position D5, a short paper supply D6, a misfeed D7, a remote communication error D8, a short toner supply D9, a short paper D10, a paper selection/size/orientation D12 are displayed in patterns.

The guidance display 71, FIG. 2, displays various kinds of messages for manipulation and alarm. The display and operation board 70 is characterized by the remote report key 83 and remote communication error indicator D8. The key 83 is pressed by the user to request a service while the indicator D8 alerts the user to a communication error. However, the remote report key 83 is not essential. For example, other particular keys may be pressed in a particular order or for a particular duration or may be pressed at the same time to implement the function of the key 83.

Figure 4:
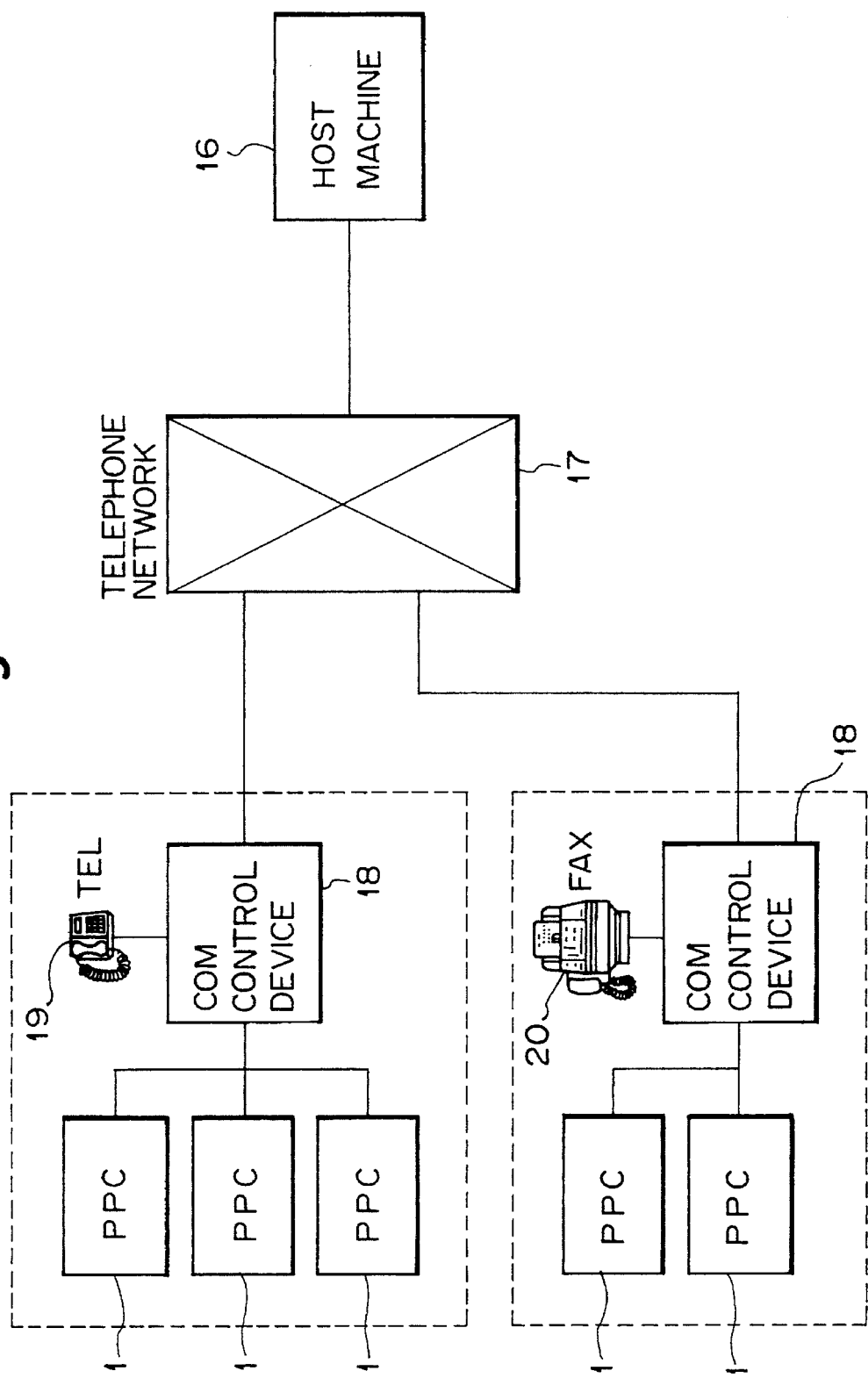
FIG. 4 is a block diagram schematically showing a specific construction of an image forming apparatus supervising system with which a communication control device embodying the present invention is practicable.

Referring to FIG. 4, a system for supervising image forming apparatuses collectively and implemented with a communication control device embodying the present invention will be described. As shown, the system includes a host machine 16 situated at a service center, copiers (CCP) or similar image forming apparatuses 1 installed at individual users' stations, and a telephone network 17 connecting the host machine 16 and copiers 1. At each user's station, the copier 1 is connected to a communication control device 18 which controls the communication of the copier 1 with the host machine 16. A telephone set 19 and/or a facsimile apparatus 20 is connectable to the control device 18. The control device 18 is inserted in the user's existing communication line. While a plurality of copiers 1 are shown as being connected to the control device 18, only one copier may, of course, be connected thereto. The copiers 1 may be of the same type or of different types and may even be replaced with, for example printers. Here, assume that five copiers 1 at a maximum can be connected to the control device 18 by way of example. The control device 18 and the copiers 1 are connected by a multi-drop arrangement based on an RS-485 standard.

The communication between the control device 18 and each copier 1 is controlled by a basic data transmission control procedure. Specifically, the control device 18 can communicate with any one of the associated copiers I by setting up a data link on the basis or a centralized control polling/selecting system in which the device 18 plays the role of a control station. Each copier is provided with an address set switch for entering a value particular to the copier. Hence, the copiers 1 are each provided with a particular polling address and a particular selecting address.

Figure 5:
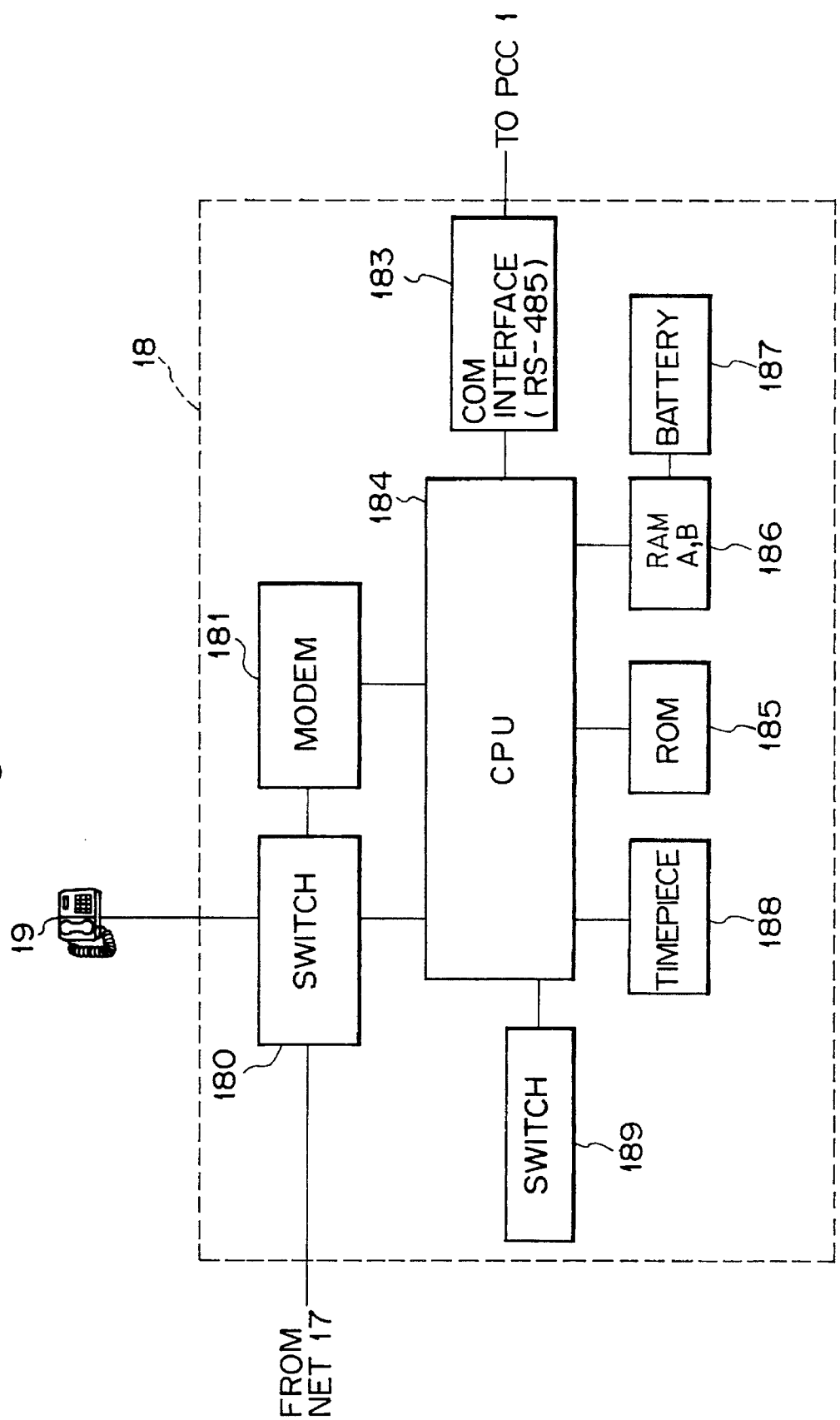
FIG. 5 is a block diagram schematically showing a specific construction of a host machine shown in FIG. 4.

FIG. 5 shows a specific construction of the control device 18. As shown, a signal from the subscriber line 17 is applied to a switching section 180. If the communication from the subscriber line 17 is addressed to the telephone 19 (or facsimile apparatus 20, FIG. 4), the switching section 180 connects it to the telephone 9 (or facsimile apparatus 20). If the communication is originated by the host machine 16, the switching section 180 connects it to a modem 181 associated with the subscriber line 17. Further, the control device 18 communicates with the copier 1 via a communication interface 183 which is implemented by a transceiver for the RS-485 application. Such control and processing are executed mainly by a CPU (Central Processing Unit) 184 according to a control program stored in a ROM (Read Only Memory) 185. A RAM (Random Access Memory) 186 is used to store interim results of processing and to store a text to be sent for a moment. Also, parameters necessary for the control device 18 to operate are written in the RAM 186 from the host machine 16. The control device 18 is continuously powered for 24 hours to be communicable with the host machine 16 anytime. In addition, the RAM 186 is backed up by a battery 187 to prevent the parameters stored in the RAM 186 from being lost due to accidental power shut-off. The control device 18 further includes a timepiece 188 and a switch 189 which allows a total counter value to be automatically sent to the host machine 16, as will be described specifically later.

Figure 6:
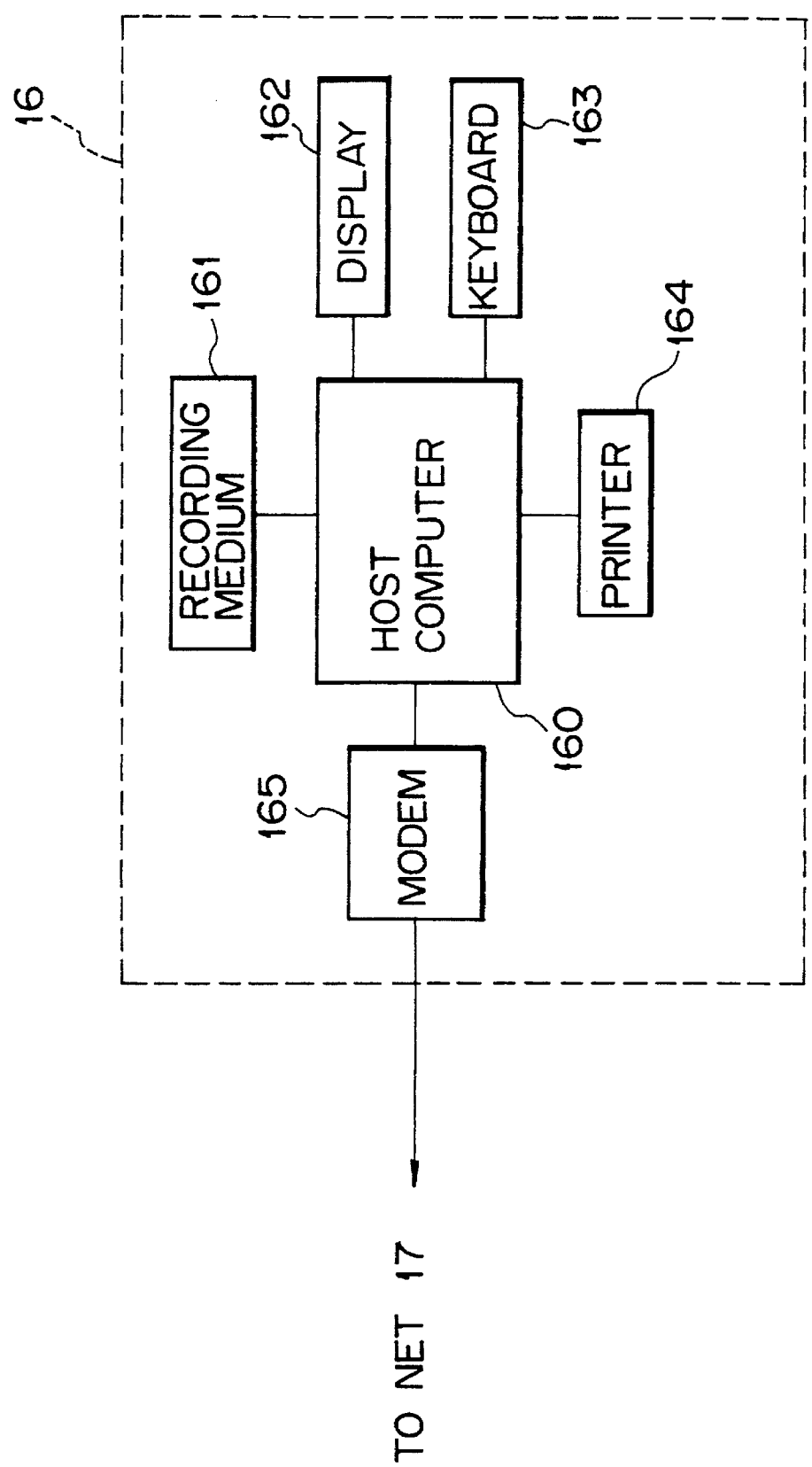

FIG. 6 shows a specific construction of the host machine 16. As shown, the host machine 16 has a host computer 160 for executing various kinds of processing, a magnetic disk or similar recording medium 161 for storing supervisory data as well as other data, a display 162, a keyboard 163, a printer 164 for outputting the supervisory data, and a modem 165 for connecting the machine 16 to the telephone network 17.

Figure 7:
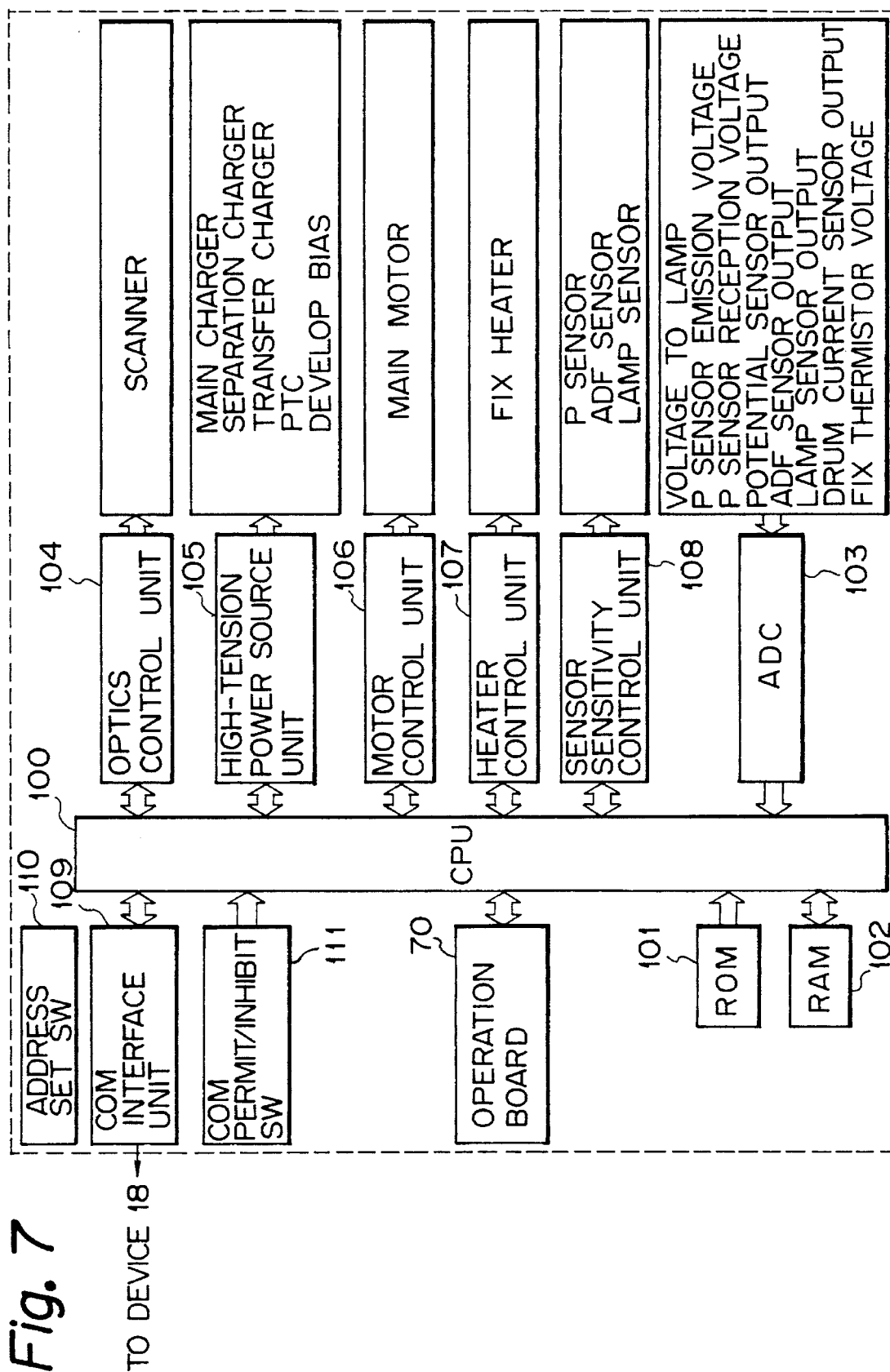
FIG. 7 is a schematic block diagram showing a specific construction of a control system incorporated in a copier of FIG. 4.

FIG. 7 shows a control system incorporated in the copier 1, FIG. 1. As shown, the copier body 2 is controlled mainly by the CPU 100 according to a control program and data stored in the ROM 101. A RAM 102 is used to store the interim results of processing. An analog-to-digital converter (ADC) 103 is used to input a voltage to be applied to the lamp 22, the emission voltage and reception voltage of the P sensor 45, the output of the potential sensor 39, the output of the ADF sensor 8, the output of a sensor responsive to the quantity of light issuing from the lamp 22, the output of a sensor responsive to a current flowing through the drum 35, the voltage of a thermistor included in the fixing unit 65, etc. An optics control unit 104 controls the scanner section 10, FIG. 1. A high-tension power source unit 105 generates high voltages to be applied to the main charger 37, separation charger 44, transfer charger 43 and pretransfer charger (PTC) 42, and a bias voltage to be applied to the developing roller of the developing unit 40.

A motor control unit 106 controls a main motor which drives the drum 35 and the rollers included in the paper feed units and transport sections. A heater control unit 107 controls the current supply to a heater which heats the fixing roller of the fixing unit 65, thereby confining the surface temperature of the roller in a predetermined range. A sensor sensitivity control unit 108 is used to change the reception gains of the lamp sensor, ADF sensor 8 and P sensor 45 as well as the emission voltage of the LED of the P sensor 45. A communication interface unit 109 allows the control system to communicate with the host machine 18 therethrough. An address set switch 110 is accessible for setting an address particular to the copier within the range of "1" to "5". A communication permit/inhibit switch 111 is operated to permit or inhibit the communication of the control system with the control device 18. Implemented by a dip switch, the switch 111 is turned on by a serviceman when the copier with the switch 111 is connected to the image forming apparatus control system (remote diagnosis system); the user, in principle, is inhibited from touching it. Therefore, the switch 111 remains in an ON state when the copier is held in connection with the remote diagnosis system.

Figure 8A:
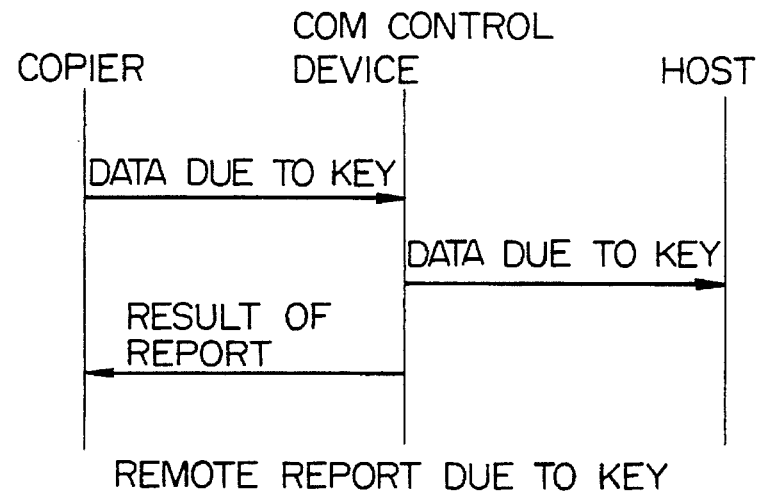
FIGS. 8A–8C each show a particular communication sequence particular to the supervising system and relating to a remote report.

The operation of the embodiment will be described with reference mainly to FIG. 8A and onward. To begin with, a reference will be made to FIGS. 8A–8C and 4 for describing the remote reporting function.

To effect a remote report, the remote report key 83 provided on the operation panel board 70, FIG. 2, is pressed. Then, as shown in FIG. 8A, the copier 1 sends remote report data to the control device 18. In response, the control device 18 dials a telephone number assigned to the host machine 16 and stored therein beforehand, thereby sending the remote report data to the machine 16. The host machine 16 is usually located at a service center. At this instant, the control device 18 sends, among a plurality of kinds of data received from the copier 1, only the data of the kinds set therein beforehand to the host machine 16. Such particular data can be set in the control device 18 by the host machine 16 via the telephone network 17. On sending all the predetermined data to the host machine 16, the control device 18 informs the copier 1 of the result of communication of the device 18 with the host machine 16. This allows the copier 1 to see if the communication was successful or failed due to some error.

Figure 8B:
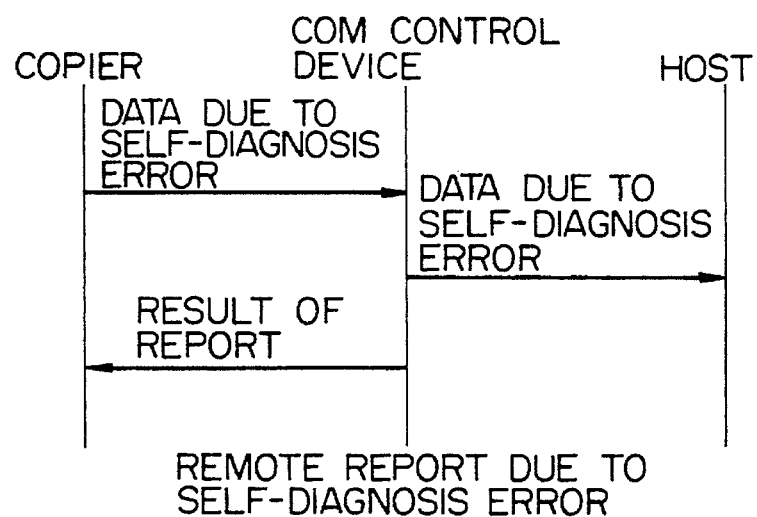

It is a common practice to provide a copier with a self-diagnosis function. When the copier is in a dangerous condition or cannot be operated, e.g., when the fixing temperature is unusual or when any of the portions to be adjusted by electronic volumes cannot be adjusted, a copier with a self-diagnosis function alerts the user or a serviceman with "Error" or "Serviceman Call". As shown in FIG. 8B, when the copier 1 finds an error occurred therein with the self-diagnosis function, it also sends remote report data to the control device 18. In response, the control device 18 sends the remote report data resulted from self-diagnosis to the host machine 16 and, on the end of communication, returns the result of communication to the copier 1.

Figure 8C:
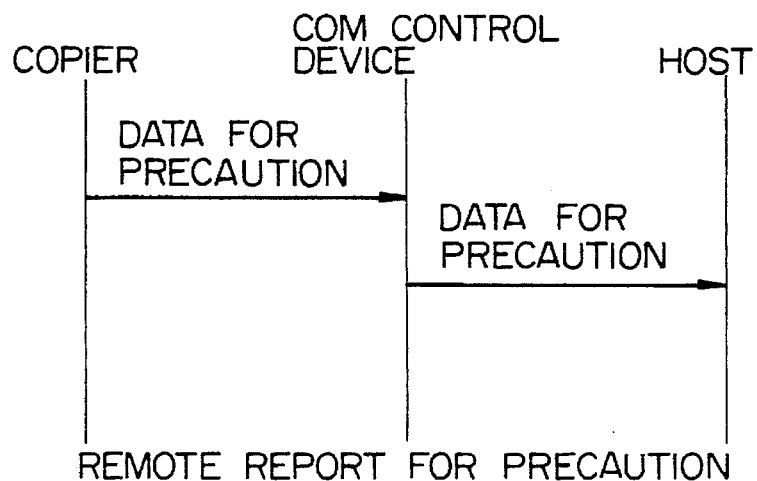

Assume that the copier 1 has determined that it is nearly abnormal, if not abnormal, by self-diagnosis and, therefore, that maintenance should preferably be effected. Then, as shown in FIG. 8C, the copier 1 sends remote report data to the control device 18 for precaution. In the case of the remote report due to an error, the copier will, of course, have been brought to an unusable state. However, in the case of the remote report for precaution, the copier is left in a usable condition; even when a communication is under way, it will perform a copying operation when a document is set and the start key is pressed. At this instant, the communication may be interrupted if the copying operation will increase the load on the controller of the copier 1 excessively or if the content included in the transmission data will be changed by the copying operation. Generally, the remote report data for precaution is not urgent. Hence, an arrangement may be made such that the control device 18 which received such data calls the host machine 16 in a time zone suitable for communication, instead of calling it immediately. The time zone suitable for communication may be one in which the telephone 19 and facsimile apparatus 20 are not used often or one in which the traffic of the network 17 is light. The time when the control device 18 should call the host machine 16 is set in the former by the latter via the network 17 and can be determined by referencing the timepiece 188, FIG. 5. Regarding the remote report for precaution, as distinguished from the other remote reports, the control device 18 does not send the result of communication to the copier 1.

Figure 9A:
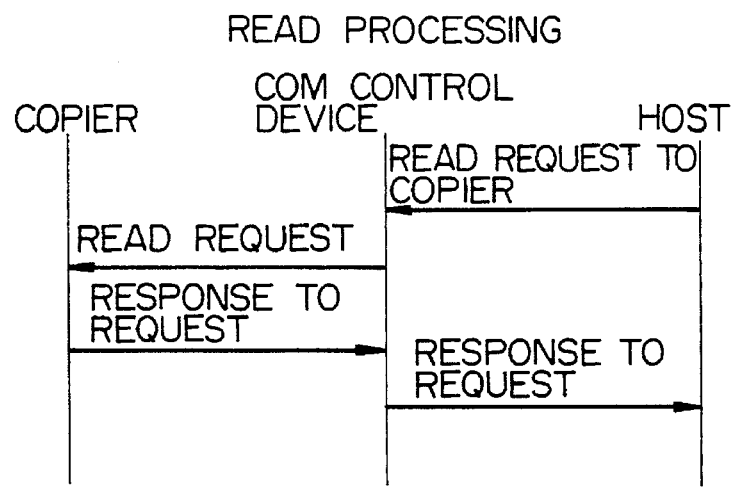
FIGS. 9A–9C each show a particular communication sequence also particular to the supervising system and relating to an access from the host machine to the copier.
Figure 9B:
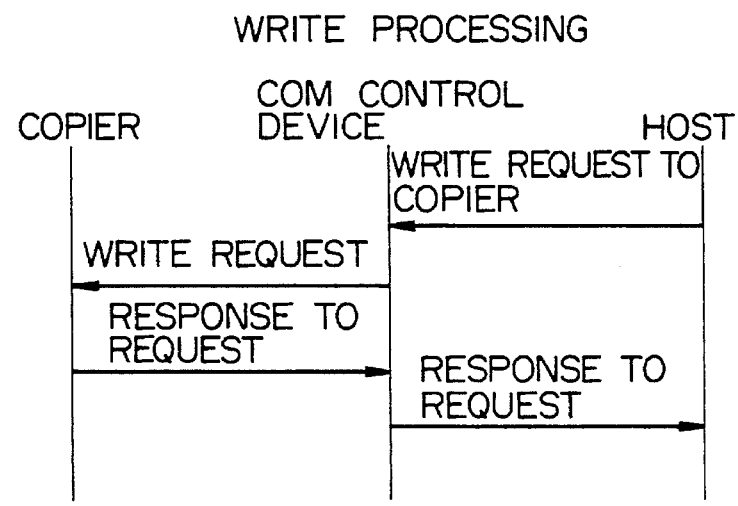
Figure 9C:
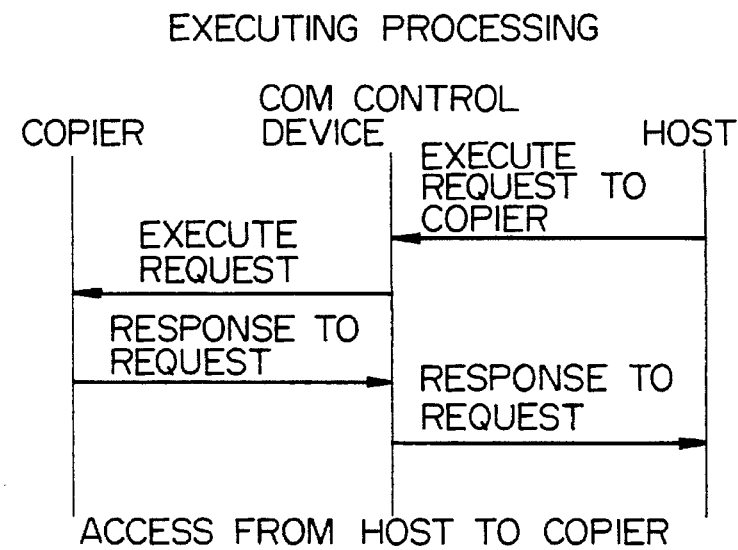

How the host machine 16 accesses the copier 1 will be described with reference to FIGS. 9A–9C. The accesses from the host machine 16 to the copier 1 are generally classified into three kinds in respect of object, i.e., a read request, a write request and an execute request. The read request refers to processing for reading logging data, various set values, various sensor outputs and so forth out of the copier 1. The write request refers to processing for sending data to the copier 1 to update the set values as well as the others. With the execute request, the host machine 16 causes the copier 1 to perform tests itself. In any of the procedures shown in FIGS. 9A–9C, the host machine 16 dials the control device 18 to which a desired one of the copiers 1 is connected, and then sends request data. On receiving the request data, the control device 18 sends them to the copier 1 of interest. In response, the copier 1 processes the content of the request and then sends a response to the request to the control device 18. The control device 18 sends the response to the host machine 16, thereby completing a single process unit.

Figure 10A:
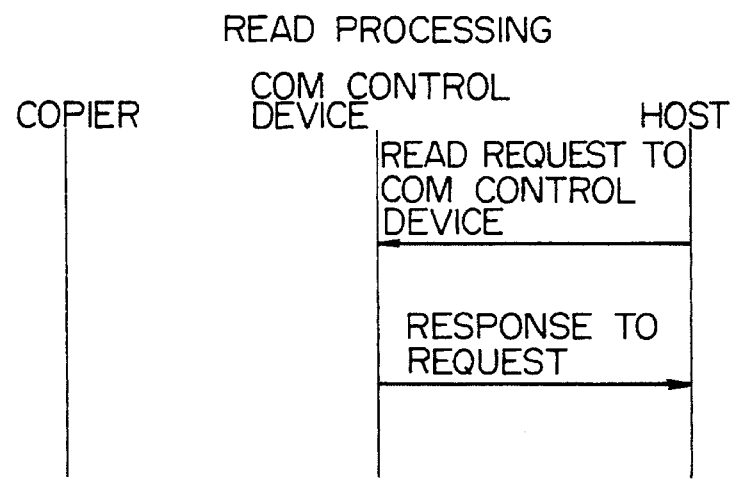
FIGS. 10A–10C each show a particular sequence also particular to the supervising system and relating to an access from the host machine to the communication control device.
Figure 10B:
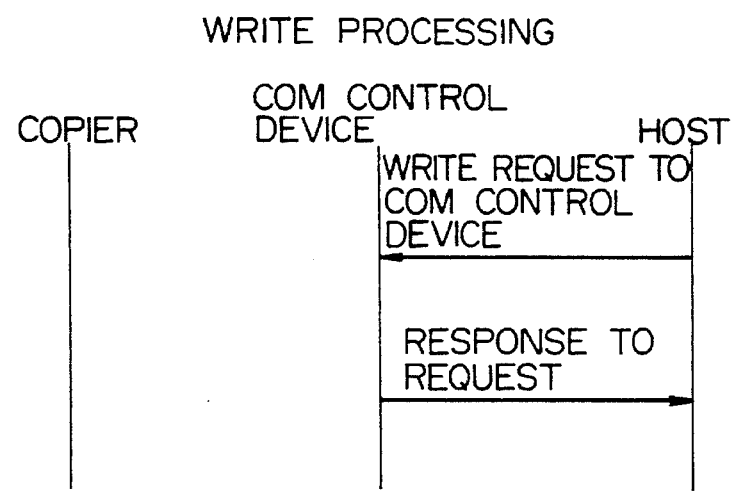
Figure 10C:
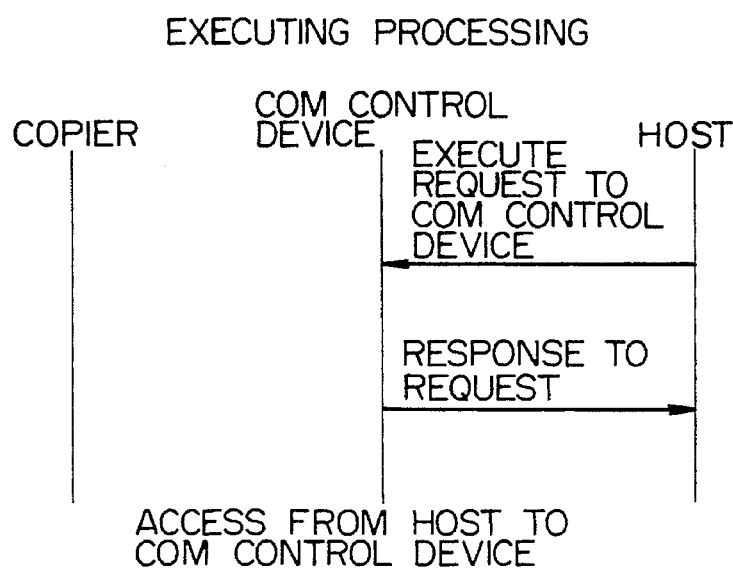

As shown in FIGS. 10A–10C, the host machine 16 accesses the control device 18 with any one of a read request, a write request, and an execute request, as in the case of the access to the copier 1. With the read request, the host machine 16 causes the control device 18 to read parameters set therein and statuses thereof and read, when the device 18 has read information out of the copier 1 and stored therein beforehand, such information. The write request refers to processing for sending parameters meant for the control device 18 from the host machine 16 to the device 18 and setting them in the device 18. With the execute request, the host machine 16 causes the control device 18 to perform function checking and other testing operations.

Figure 11:
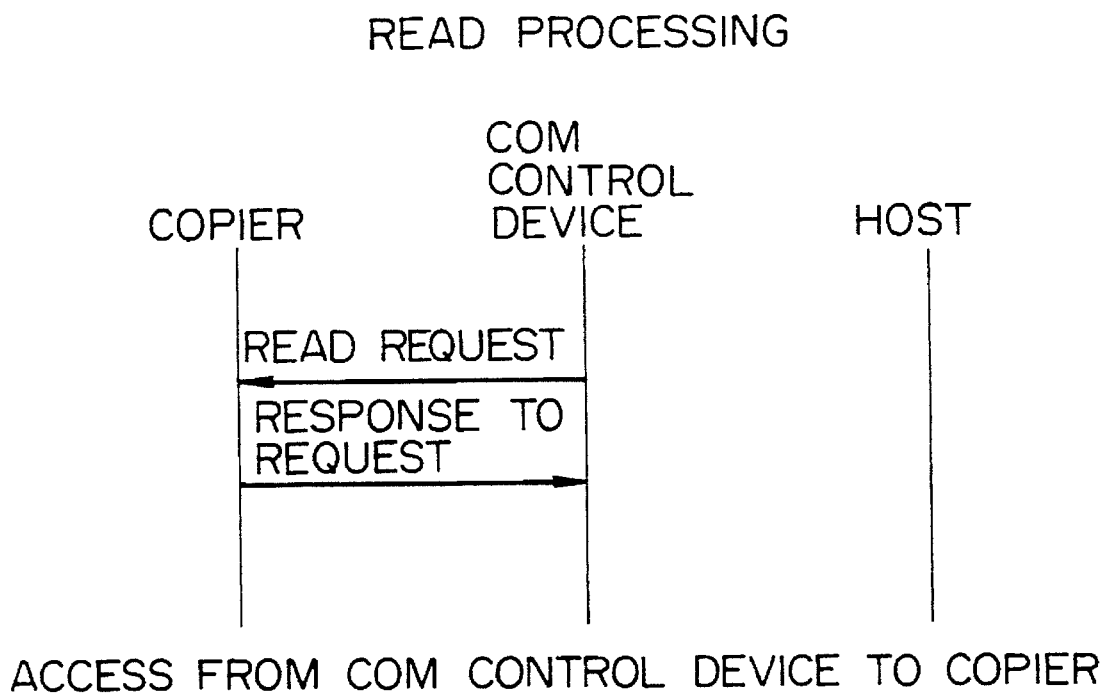
FIG. 11 shows a communication sequence in which the communication control device accesses the copier without the intermediary of the host machine.

FIG. 11 shows a procedure in which the control device 18 accesses the copier 1 without the intermediary of the host machine 16. This procedure allows the control device 18 to read information out of the copier 1 and store them in itself. The host machine 16 can read the information out of the control device 18 later.

Figure 12B:
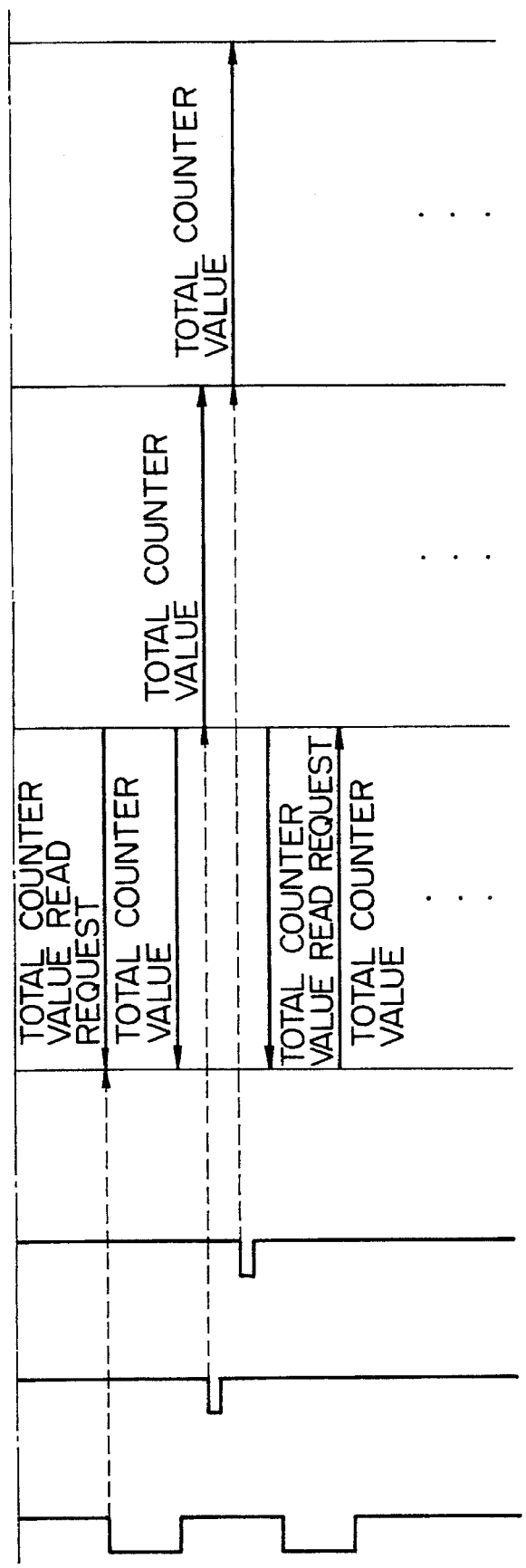
FIG. 12 shows a communication sequence also particular to the supervising system and implementing the transfer of a total counter value.

Referring to FIG. 12, a communication procedure associated with particular data will be described. It is a common practice with a copier to use the content of a counter representative of the total number of copies produced (referred to as a total counter value hereinafter) as particular data for maintenance. As the copier 1 sends the total counter value to the control device 18 periodically, the host machine 16 can see it even when the copier 1 is unable to communicate, e.g., when the power supply to the copier 1 is shut off. This can be done since the control device 18 has a function of reading information out of the copier 1 and storing them in itself, as stated previously. The control device 18 has a timer for the collection of total counter values and which is included in the timepiece 188, FIG. 5. The parameters set in the control device 18 include a time for collecting total counter values. When the time for collecting total counter values is reached as determined by the above-mentioned timer, the control device 18 sends a read request to all the copiers 1 connected thereto one after another every day, thereby reading their total counter values sequentially.

On receiving a new total counter value from any one of the copiers 1, the control device 18 updates the value read the day before and stores the updated value in the area of the RAM 186 assigned to total counter values (referred to as a memory A hereinafter). When the copier 1 which received the read request is unable to communicate, e.g., when the power supply thereto is shut off, the control device 18 goes to the next copier 1, skipping it. After sending the read request to all the copiers 1, the control device 18 again sends a read request to the copiers 1 which failed to receive the request. Nighttime is selected as the time for collecting total counter values since the copiers 1 are usually not expected to be powered at nighttime. Then, just after the power supply to the copiers 1 has been sequentially set up in the morning, the above communication is executed while the idling or adjustment of the copiers 1 are under way. Further, when the copier 1 which received the read request from the control device 18 does not return an answer, the device 18 sends the read request to the copier 1 repetitively until it receives a response. Assuming that a single copier 1 is connected to the control device 18, the device 18 sends the read request every fifteen seconds.

The parameters set in the control device 18 also include a date for transferring the total counter values. When this date is reached as determined by a total counter value transfer timer (included in the timepiece 188), the control device 18 transfers the total counter values from the memory A of the RAM 186 to a total counter value transfer area (referred to as a memory B hereinafter) also included in the RAM 186. Usually, the total counter transfer date is set at, for example, the monthly add-up day of the maintenance contract. This allows the total counter values to be stored in the RAM 186 on every add-up day even when the copiers 1 are unable to communicate. The total counter values stored in the memory B of the control device 18 are sent to the host machine 16 by either of two different methods, i.e., a method which causes the host machine 16 to access the control device 18 periodically, e.g., on the monthly add-up day, and a method which causes the control device 18 to send the total counter values to the host machine 16 automatically when a date set in the device 18 for reporting the total counter values automatically is reached. One of such two methods is selected by the previously mentioned switch 189, FIG. 5. While the switch 189 is in an ON state, the control device 18 dials the host machine 16 automatically when the automatic report date set therein is reached. When the switch 189 is in an OFF state, the control device 18 simply awaits an access from the host machine 16. It is to be noted that the total counter value described above is a mere example of particular data and may be replaced with any other data or may be sent together with other data.

Figure 13B:
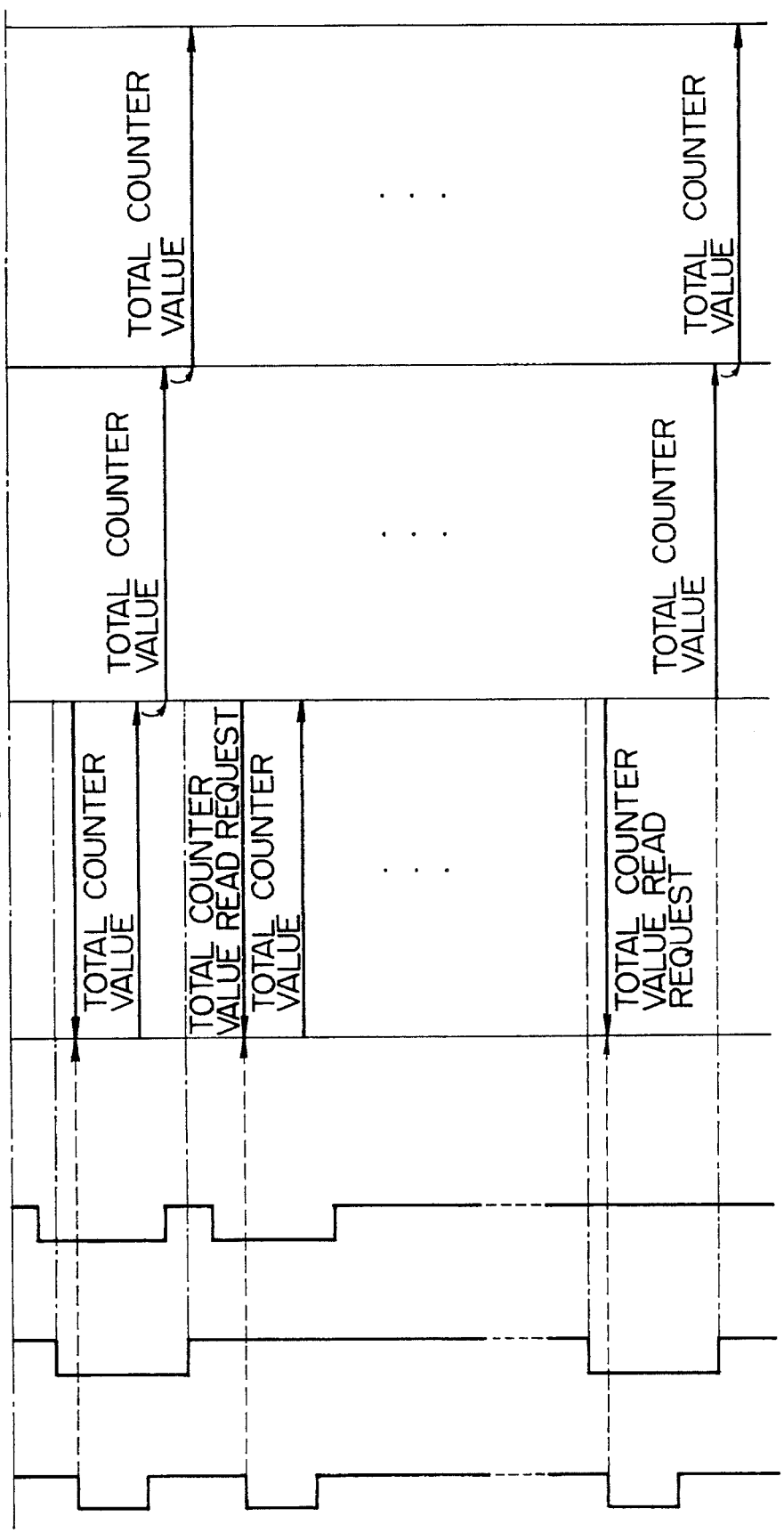
FIG. 13 shows another communication sequence relating to the transfer of a total counter value.

Another specific procedure for sending particular data is shown in FIG. 13. As shown, assume that the control device 18 has collected a total counter value from a given copier 1 within a predetermined period of time after the total counter value transfer date or has not received it even after the predetermined period of time. Then, the control device 18 transfers the total counter value from the memory A to the memory B. Further, triggered by the transfer of the total counter value, the control device 18 sends the value to the host machine 16.

FIG. 14 is a table listing the parameters set in the control device 18. As shown, a type number and a serial number assigned to each copier 1 are registered at the control device 18. When the copiers 1 communicate with the control device 18, they send the type numbers and serial numbers thereof to the device 18 together with data. Also, when the host machine 16 accesses the copiers 1, the type numbers and serial numbers are used to determine the addresses of the copier 1. The telephone number of a destination, the number of times and interval of redialing, and the kinds of data to be sent to the host machine 16 are also registered at the control device 18 on the basis of the reason for the remote report. Regarding the remote report for precaution, the time when it is effected is also registered. A checksum is added to each parameter block and used to detect an occurrence that the value of the parameter is changed or lost due to the malfunction of the control device 18 or the consumption of the back-up battery 187. In the illustrative embodiment, such parameters are written to the control device 18 by the host machine 16 via the network 17. Alternatively, a portable apparatus for setting the parameters may be directly connected to the control device 18 at the user's station, or extra setting means may be provided on the control device 18.

FIGS. 15A–15C show specific data formats for implementing a remote report. The format of FIG. 15A is used for the communication from the copier 1 to the control device 18. As shown, the format is headed by a field assigned to a code representative of the reason for the remote report, i.e., whether the remote report is based on the remote report key, error found by self-diagnosis, or precaution. This reason for remote the report is followed by information relating to the inside of the copier. States of a copier included in the format include the conditions of toner, oil, paper and other supplies, the outputs of various sensors, the set values of various adjustable portions, and the connection states of units. The data format shown in FIG. 15B implements the communication from the control device 18 to the host machine 16. As shown, the control device 18 sends, before the data received from the copier 1, a type number field and a serial number field for specifying the copier 1 which is the information source. This format ends with the time when the report factor occurred as determined by the timepiece 188 of the control device 18. Regarding the data fields, while the kinds of data to be sent to the host machine 16 depend on the parameters set in the control device 18, FIG. 15B shows a specific condition wherein parameters are set such that only the number of times that an error has been found by self-diagnosis and the states of the copier are sent. The data format shown in FIG. 15C is used for the control device 18 to send the result of communication to the copier 1 on completing the communication with the host machine 16.

FIG. 16 shows a data format for implementing, among the accesses from the host machine 16 to the copier 1, the access for executing the read processing. As shown, the host machine 16 sends to the control device 18 a request code representative of read processing and a code representative of an item to read after the type number and serial number of the copier 1. In response, the control device 18 removes the type number and serial number fields from the received data format and sends only the read request code and item code to the copier 1. The copier 1 which receives such codes sends a read response code, the received item code, and then requested data to the control device 18. The control device 18 again adds the type number and serial number to the codes and data received from the copier 1 and sends them to the host machine 16.

Figure 17:
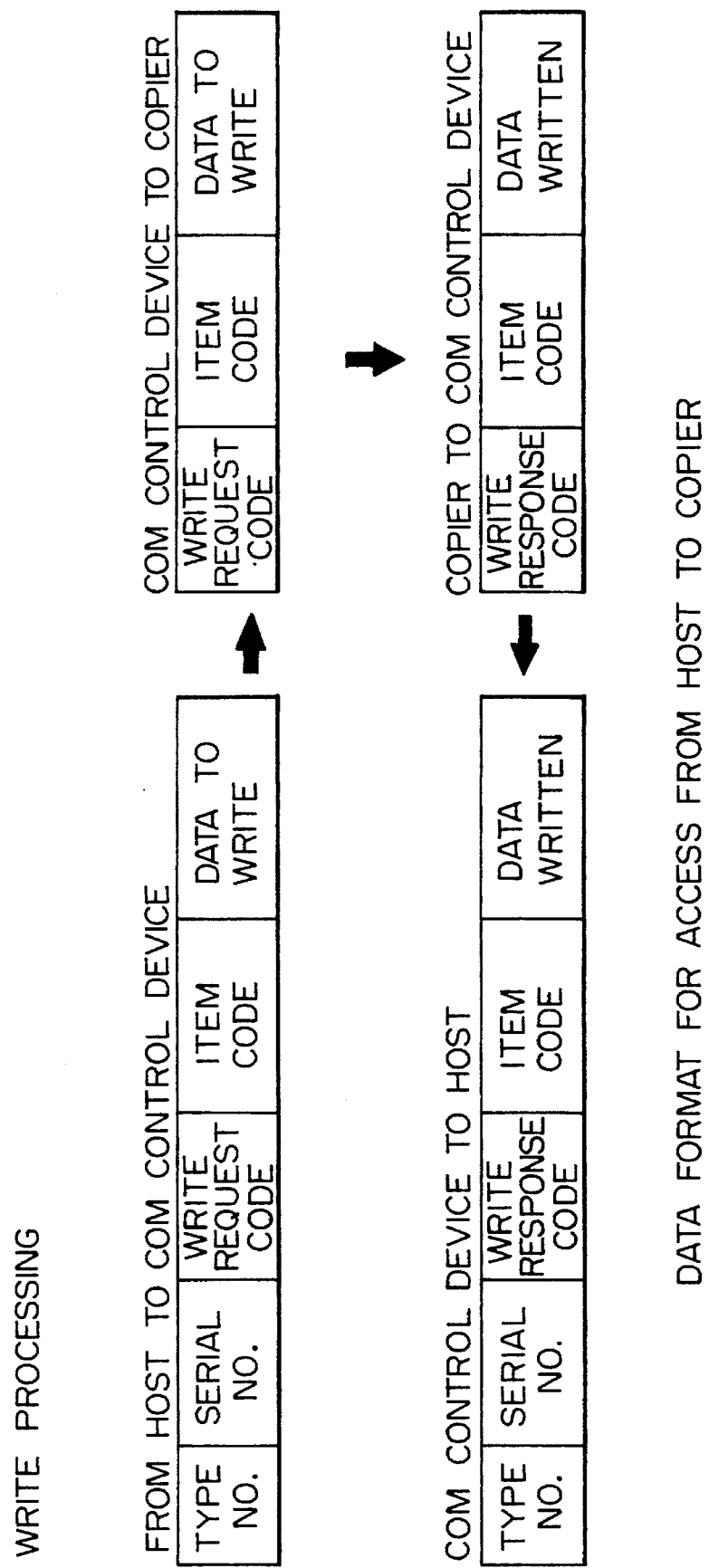

FIG. 17 shows a data format for implementing the write processing. As shown, for a communication meant for the copier 1, data to write is added to the item code described above in relation to the read processing. On the other hand, for a communication meant for the host machine 16, data actually written in the copier 1 is sent after the item code field. While the data to be written to the copier 1 and the data to be sent from the copier 1 are expected to be identical, they will not be identical when, for example, the received data exceeds a valid range and is rounded to a boundary value.

FIG. 18 shows a data format applicable to the execute processing. In this case, assume that a communication meant for the copier 1 cannot designate the object of operation with the item code alone. Then, a code for supplementing the content of operation is sent after the item code. The copier 1 which performed the requested operation sends the result of operation to the host machine 16 via the control device 18.

FIGS. 19A–19C show data formats available for the host machine 16 to access the control device 18 and implementing the read processing, write processing, and execute processing, respectively. The data formats of FIGS. 19A–19C are essentially similar to the formats used for the access to the copier 1 except that the type number and serial number are replaced with a code representative of the control device 18.

FIG. 20 shows a data format with which the control device 18 accesses the copier 1. As shown, the format of FIG. 20 is identical with, among the formats shown in FIGS. 16–18, the format implementing the communication between the control device 18 and the copier 1. Therefore, the copier 1 does not have to distinguish the accesses from the host machine 16 and can handle them in the same way.

Figure 21:
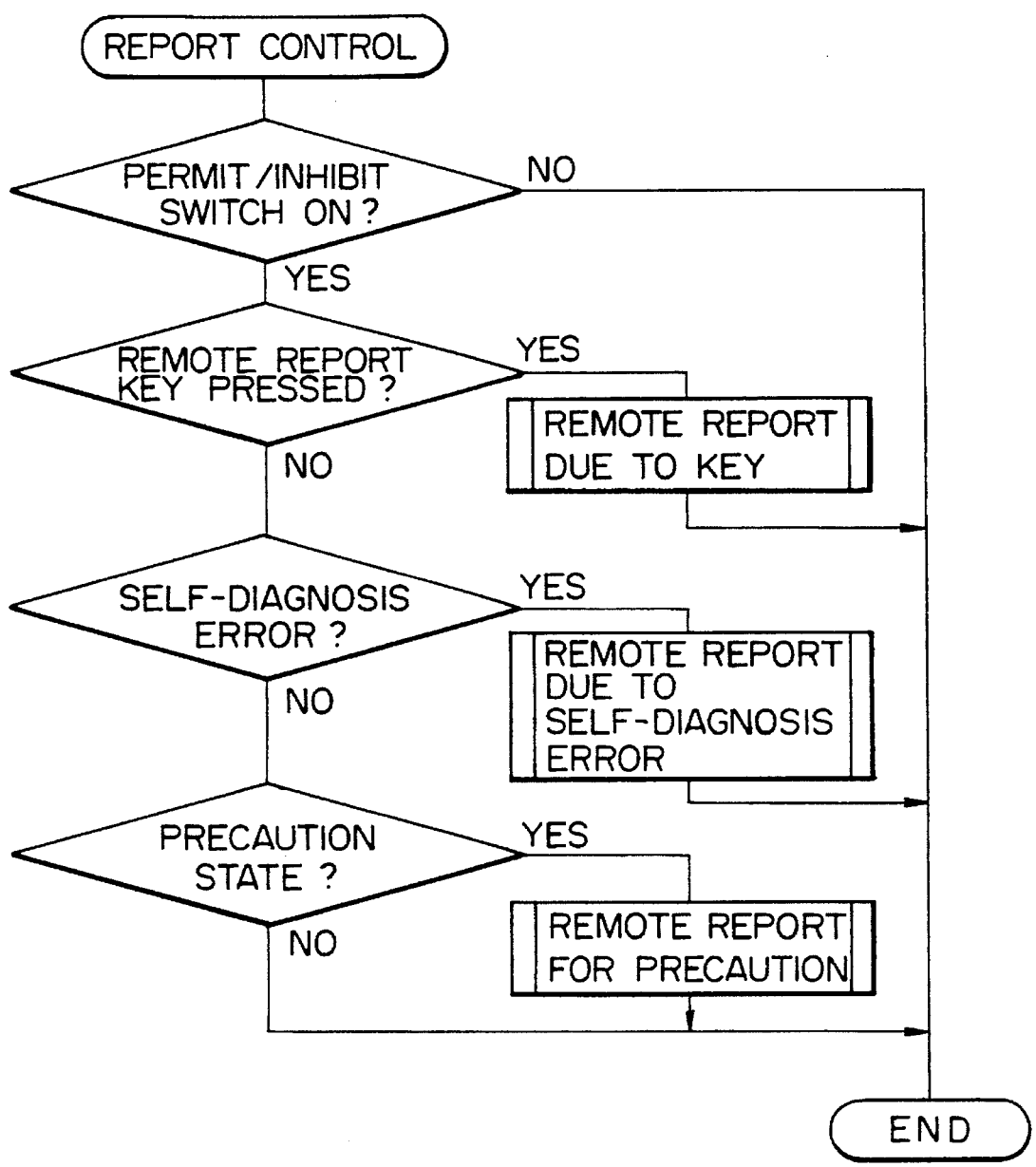
FIG. 21 is a flowchart demonstrating a main routine which a CPU (Central Processing Unit) built in the copier executes for report control.

FIG. 21 is a flowchart demonstrating a main routine for report control and executed by the CPU 100. FIG. 7, of the copier 1. As shown, assume that the communication permit/inhibit switch 111 located outside the operation board 70 of the copier 1 is in an ON state. Then, when the CPU 100 determines that the remote report key 83, FIG. 2, has been pressed, that an error has been found by self-diagnosis, or that a precaution is necessary, it executes a corresponding remote report procedure.

Figure 22:
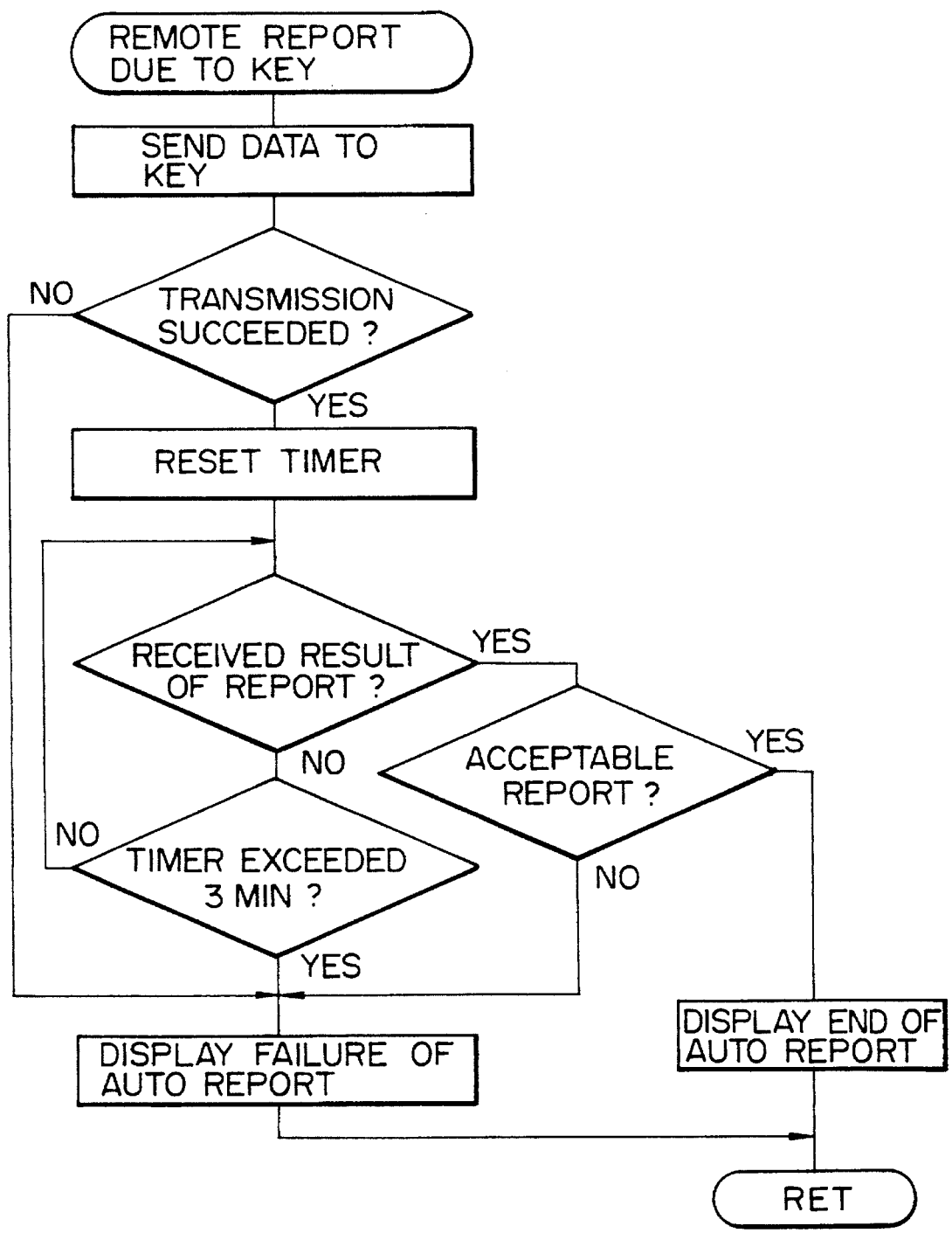
FIGS. 22, 23 and 24 are flowcharts respectively representative of a remote report key subroutine, a self-diagnosis error subroutine, and a precaution subroutine included in the main routine of FIG. 21.

FIG. 22 is a flowchart representative of a subroutine included in the main routine of FIG. 21 and relating to the remote report key 83. As shown, the CPU 100 sends remote report data to the control device 18 in response to the operation of the key 83. When the report fails, e.g, when the control device 18 does not answer, the CPU 100 turns on the remote communication error indicator D8 on the operation board 70 or causes it to blink to alert the user to the failure. When the data was successfully sent to the control device 18, the CPU 100 resets a timer use to determine a time over and then awaits the result of report from the control device 18. In the illustrative embodiment, when the result of report is not received from the control device 18 within 3 minutes, the CPU 100 determines that time is over. Then, the CPU 100 again causes the remote communication error indicator D8 to glow or blink. When the result of report is received within 3 minutes, the CPU 100 determines whether or not the report was successful by examining the result. If the report was successful, the CPU 100 displays it graphically (although not shown); if otherwise, the CPU 100 causes the remote communication error indicator D8 to glow or blink.

Figure 23:
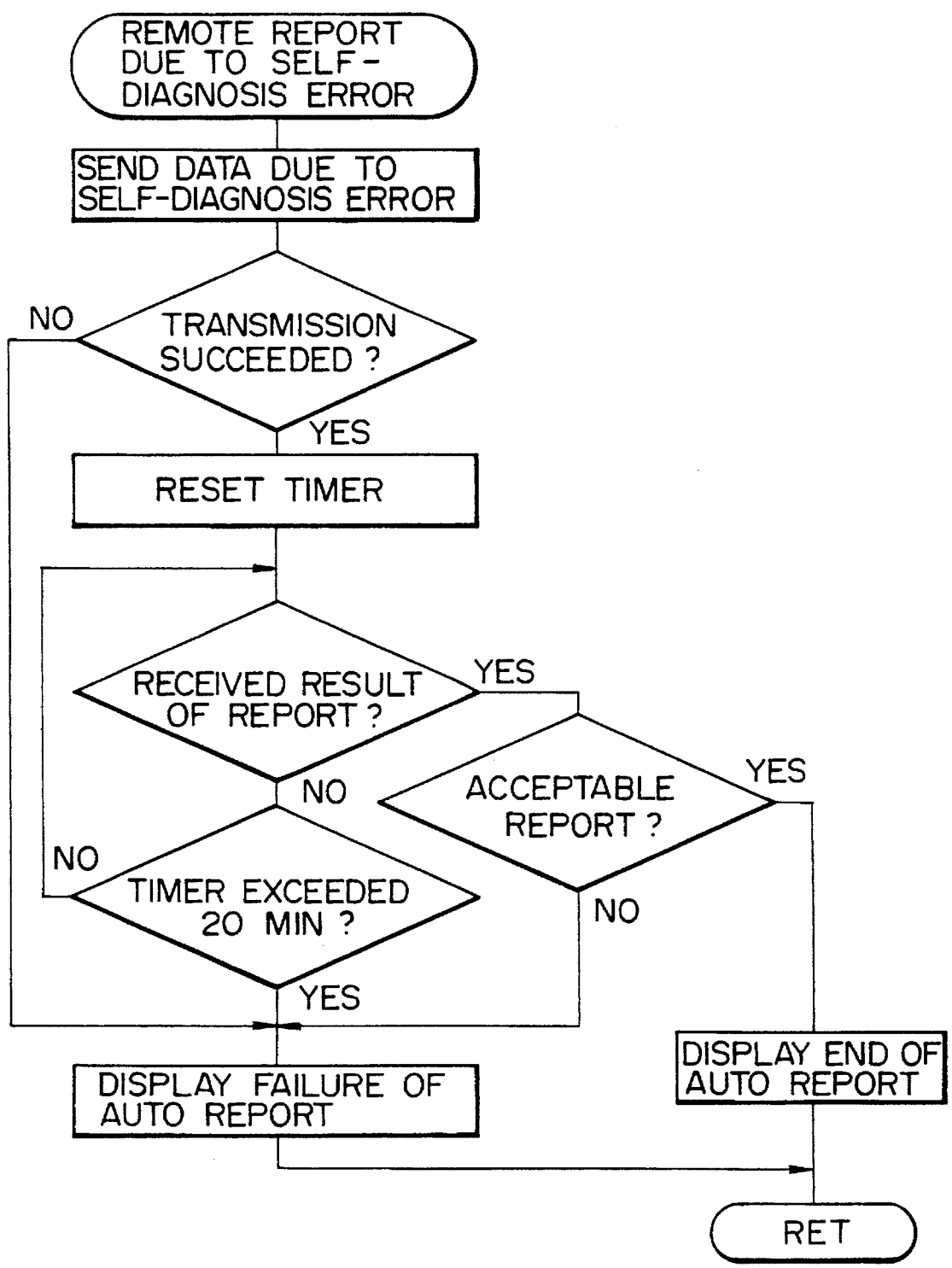

FIG. 23 shows a remote report subroutine also included in the main routine of FIG. 21 and relating to an error found by self-diagnosis. As shown, this subroutine is identical with the subroutine of FIG. 22 except that the data to be sent to the control device 18 is the data associated with self-diagnosis and that the time is determined to be over when 20 minutes expires.

Figure 24:
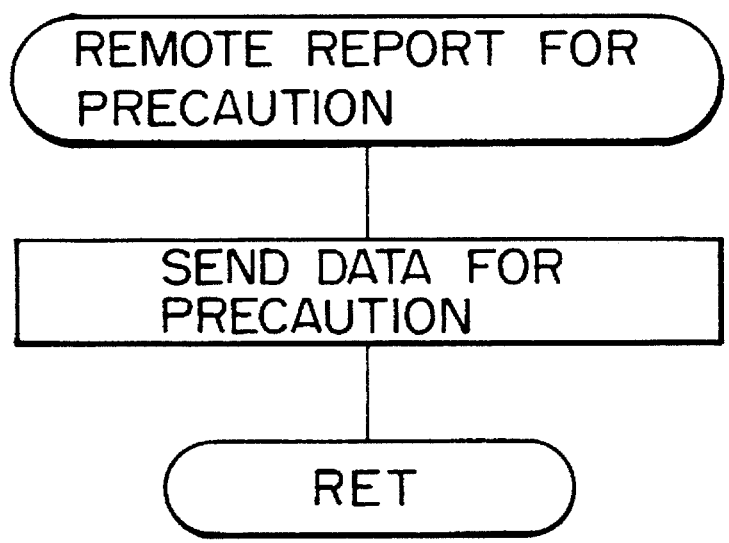

FIG. 24 shows a remote report subroutine further included in the main routine of FIG. 21 and relating to a precaution. In this routine, the CPU 100 sends data for a precaution to the control device 18.

Figure 25:
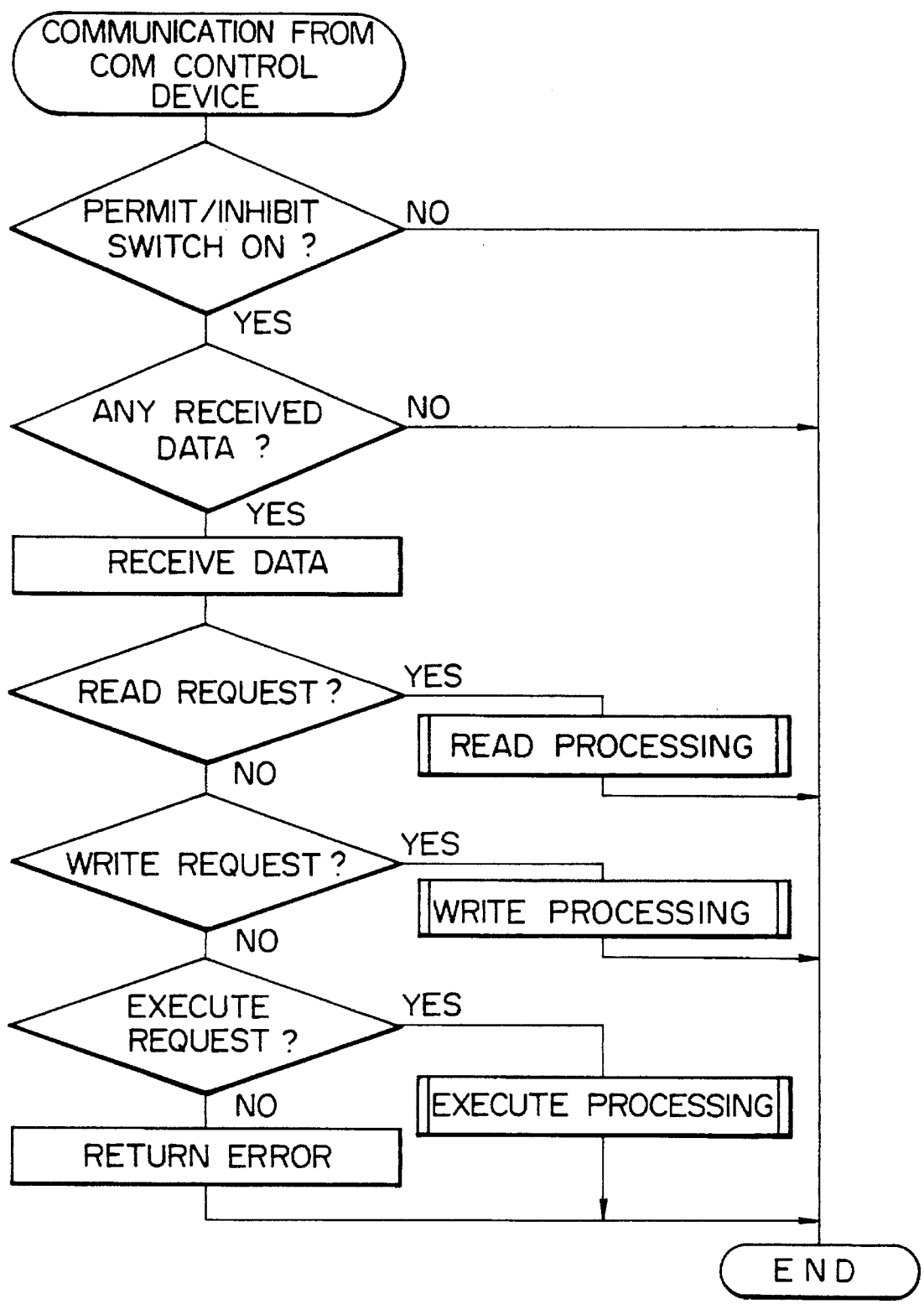
FIG. 25 is a flowchart representative of a main routine which the CPU of the copier executes when accessed by the communication control device.

FIG. 25 is a flowchart demonstrating a main routine which the CPU 100 executes when the control device 18 accesses the copier 1. As shown, assume that the interface unit 109 has received data while the communication permit/inhibit switch 111, FIG. 7, is in an ON state. Then, the CPU 100 determines the kind of processing or request, i.e., read request, write request or execute request indicated by the first field of the data, and then executes corresponding processing. When the first field of received data does not indicate any one of the three kinds of request, the CPU 100 returns an error code and ends the procedure.

Figure 26:
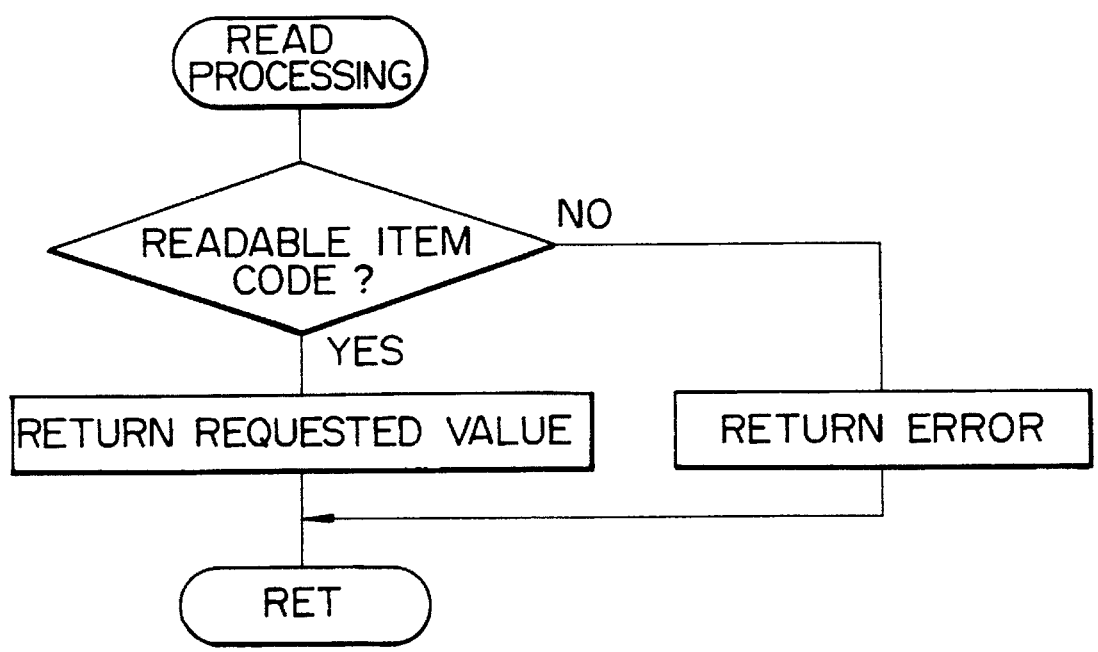
FIGS. 26, 27 and 28 are flowcharts showing respectively a read process subroutine, a write process subroutine, and an execute process subroutine included in the main routine of FIG. 25.

FIG. 26 shows a read process subroutine included in the main routine of FIG. 25. As shown, if the item code received by the copier 1 is correct or readable, the CPU 100 returns requested data; if otherwise, the CPU 100 returns an error code.

Figure 27:
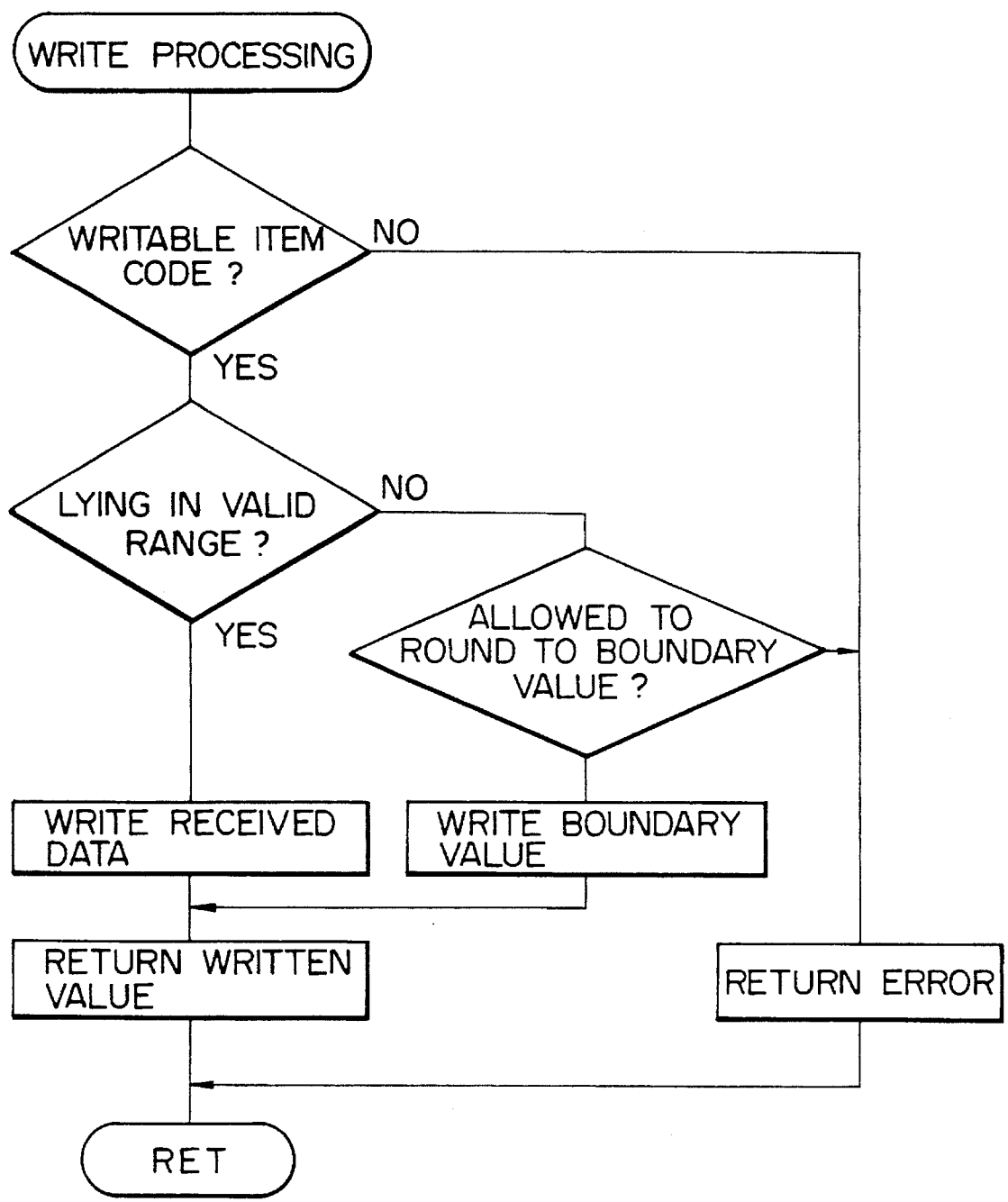

FIG. 27 shows a write process subroutine also included in the main routine of FIG. 25. As shown, if the received item code is not correct or writable, the CPU 100 returns an error code. If the item code is correct, the CPU 100 checks the value to write and, if it lies in a valid range, writes the received data. If the value does not lie in the valid range and if the item is of the kind allowing the data to be rounded to the boundary value of the valid range, the CPU 100 writes the boundary value. If the item is not of the kind mentioned, the CPU 100 sends an error code and then returns. Whether the data should be rounded or not depends on the item code. For example, the fixing temperature and the telephone number of the service center are inhibited from being rounded to the boundary value; the fixing temperature will have great influence when rewritten, even if it lies in the valid range, while the telephone number of the service center is meaningless in respect of numerical value. On the other hand, an auto reset time and other items of the kind not effecting image quality are allowed to be rounded. When the auto reset time, for example, should be extended as far as possible, the maximum value available with the number of digits may be written; then, the copier 1 will select the maximum value automatically.

Figure 28:
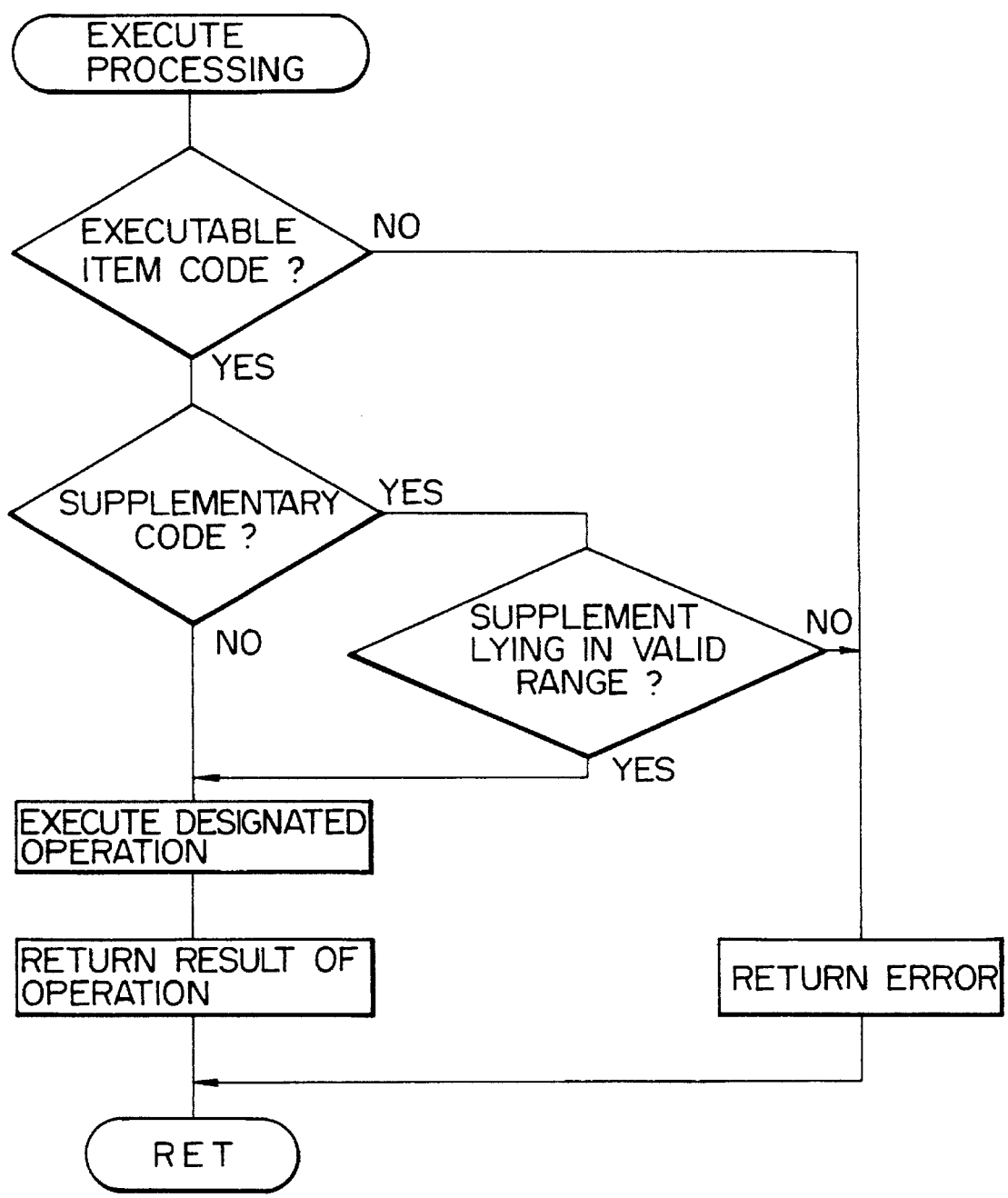

FIG. 28 shows an execute process subroutine further included in the main routine of FIG. 25. As shown, if the received item code is not correct or executable, the CPU 100 returns an error code. If the item code is correct, the CPU 100 determines whether or not the item needs a supplementary operation content and, if the answer is negative, executes the designated operation, and then returns the result of operation. If the item needs a supplementary content, the CPU 100 executes an operation according to the supplementary information. At this instant, if the supplementary content does not lie in the valid range, the CPU 100 sends an error code and returns.

Figure 29:
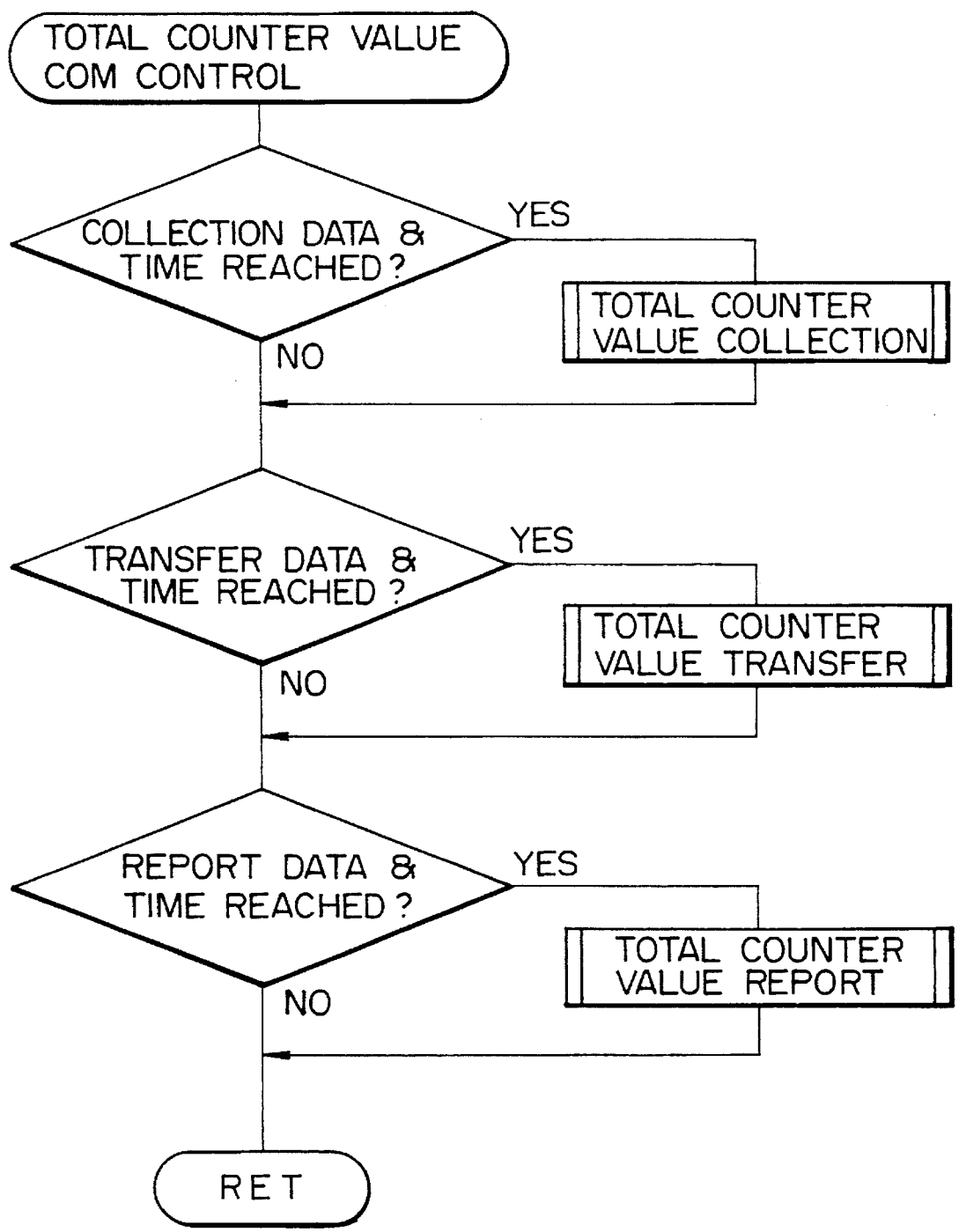
FIG. 29 is a flowchart demonstrating total counter value communication control associated with FIG. 12 and executed by the communication control device.

FIG. 29 is a flowchart representative of control over the total counter value communication shown in FIG. 12 and executed by the control device 18. As shown, based on the previously stated timers (total counter control timers) included in the control device 18 and the collection date, transfer date and report date set in the control device 18, the control device 18 executes total counter value collection control, total counter value transfer control, and total counter value report control which will be described later.

Figure 30:
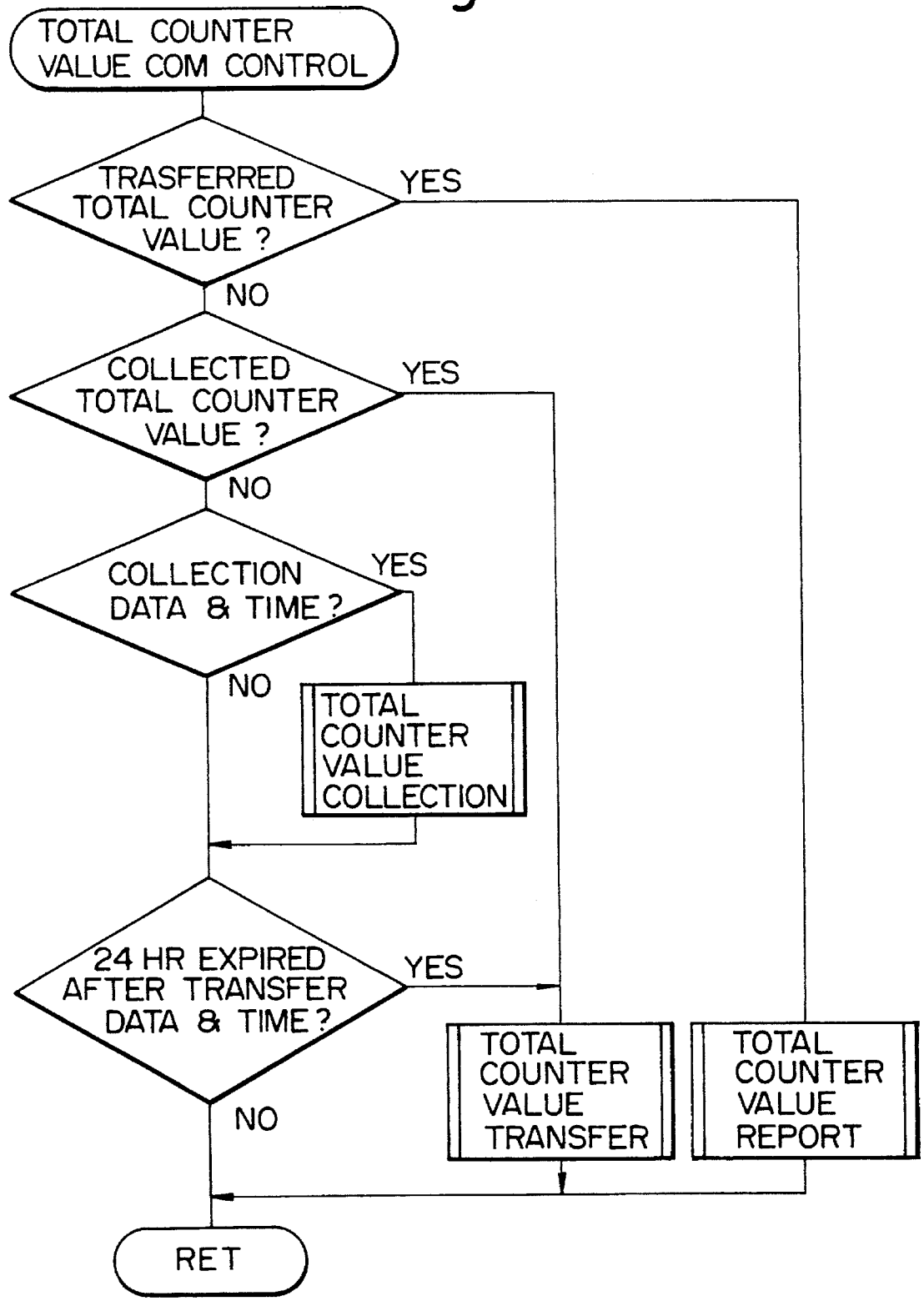
FIG. 30 is a flowchart showing total counter value communication control associated with FIG. 13 and executed by the communication control device.

FIG. 30 demonstrates control over the total counter value communication shown in FIG. 13 and executed by the control device 18. As shown, when total counter transfer control is executed, total counter value report control is executed. Also, the total counter value transfer control is executed when total counter value collection control is executed or when it is not executed even on the elapse of the transfer processing time after the total counter value transfer date set in the control device 18. In the specific procedure, the transfer processing time is assumed to expire in 24 hours. The collection of total counter values is performed on the basis of the timer installed in the control device 18.

Figure 31:
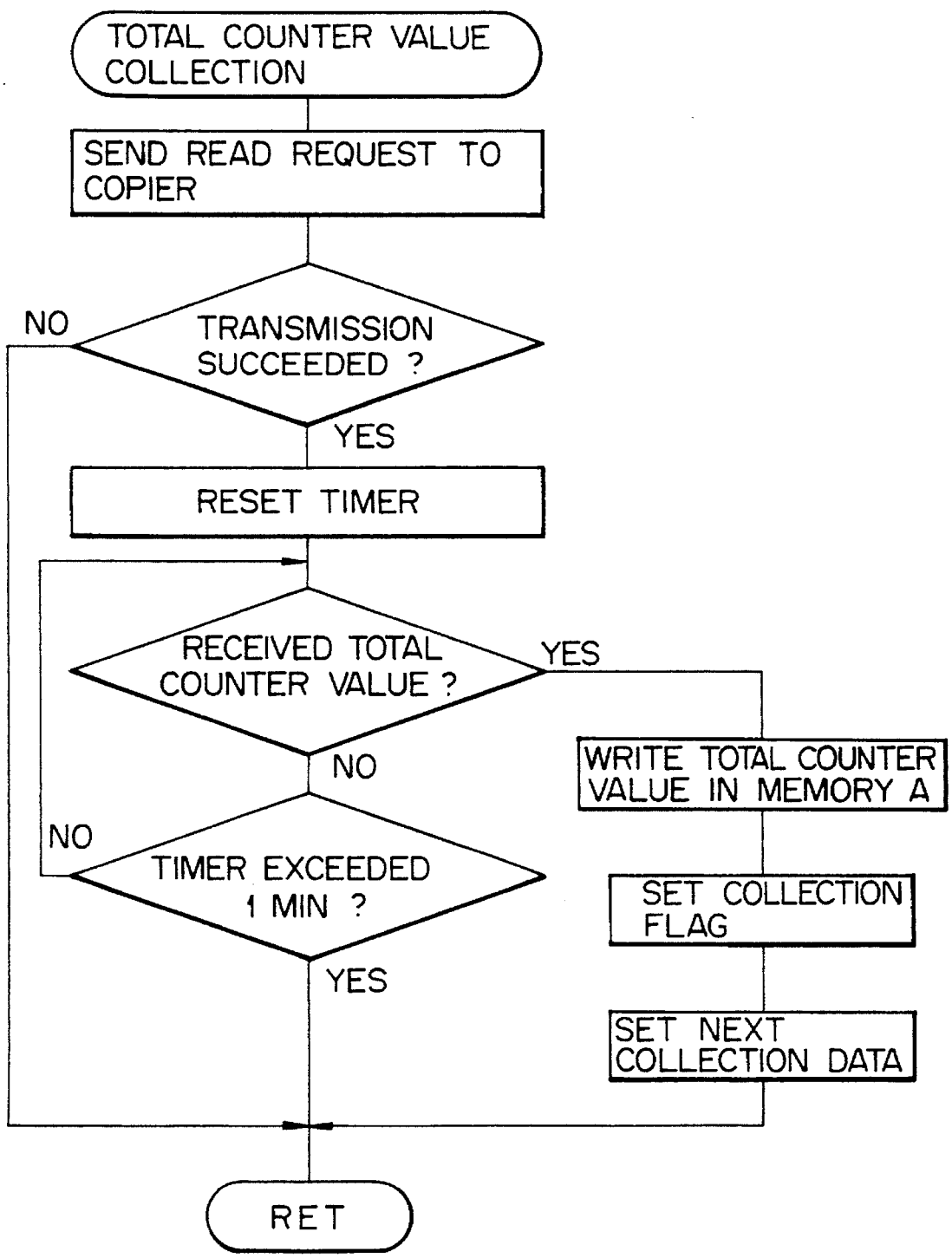
FIGS. 31, 32 and 33 are flowcharts showing respectively a total counter value collection subroutine, a total counter value transfer subroutine, and a total counter value report subroutine included in the procedure of FIG. 29 or 30.

FIG. 31 shows a total counter value collection control subroutine included in the procedure of FIG. 29 or 30. As shown, the control device 18 sends a total counter value read request to the copier 1 and then determines if the request was sent correctly or not. If the transmission failed, e.g., when the copier 1 did not return a response, the program returns. If the transmission was successful, the control device 18 resets a timer, not shown, and then awaits a total counter value from the copier 1. In the specific procedure, 1 minute is set in the timer. When the control device 18 does not receive a total counter value within 1 minute, the program returns determining that time is over. When the control device 18 receives it within 1 minute, the device 18 writes it in the memory A, sets a total counter value collection flag, sets the next date for collection, and then returns.

Figure 32:
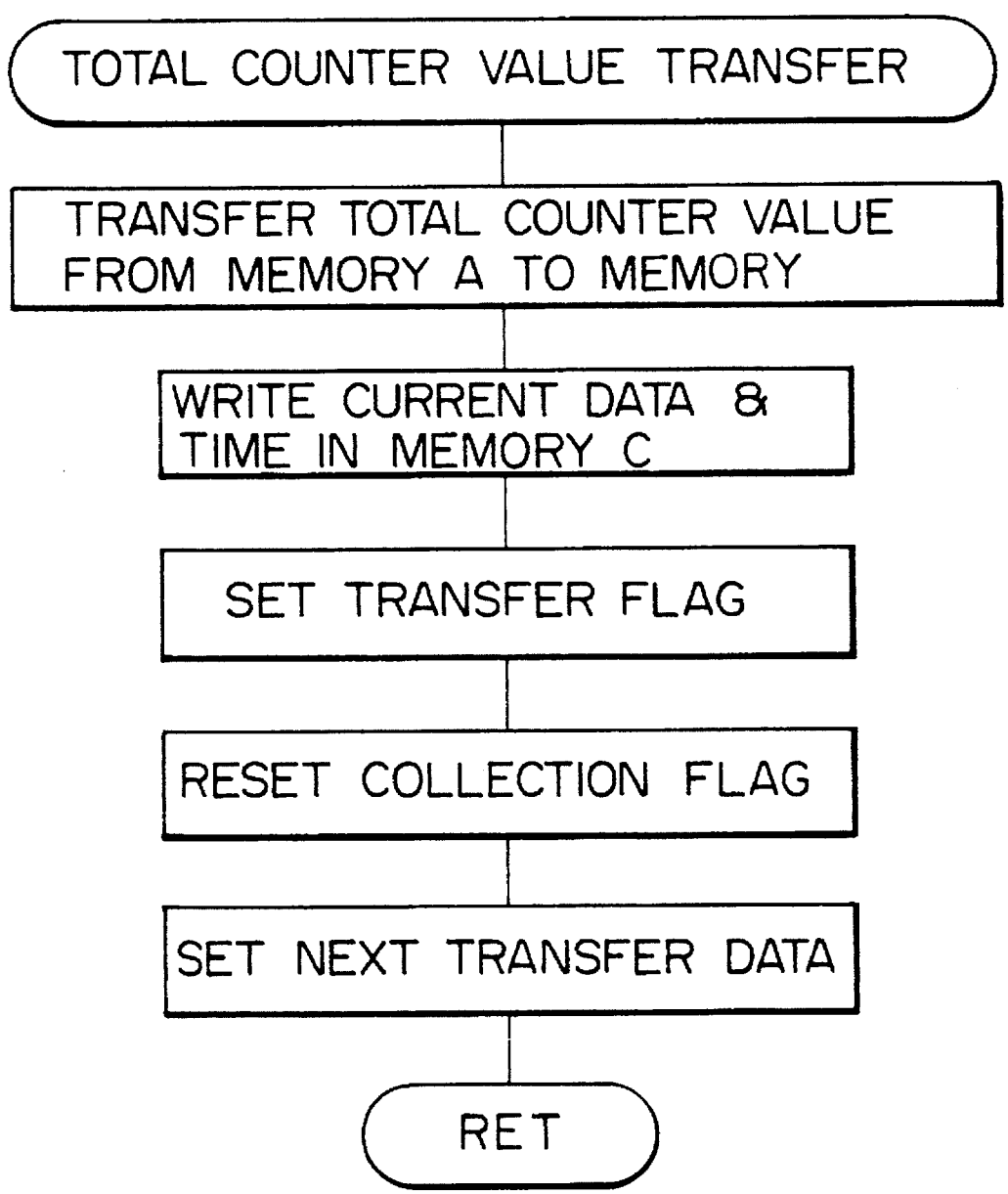

FIG. 32 shows a total counter value transfer control subroutine included in the procedure of FIG. 29 or 30. As shown, the control device 18 reads total counter values out of the memory A, transfers them to the memory B, executes processing to be described sequentially, and then returns. The control device 18 writes the current date when the transfer from the memory A to the memory B occurred in a date area (referred to as a memory C hereinafter) also provided in the RAM 186, FIG. 5. Subsequently, the control device 18 sets a total counter value transfer flag, resets the total counter value collection flag, and then sets the next date for collecting a total counter value.

Figure 33:
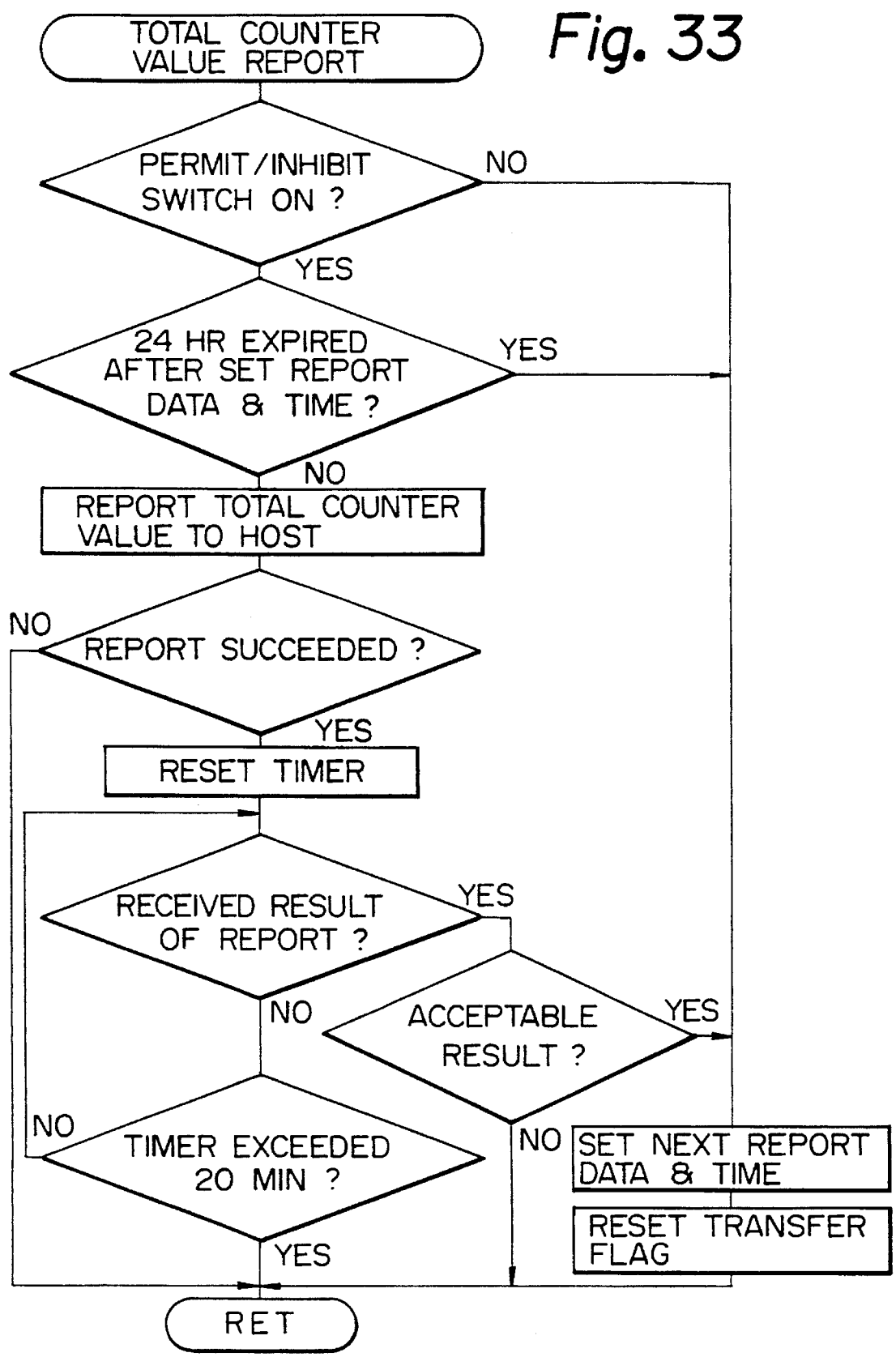

FIG. 33 shows a total counter value report control subroutine also included in the procedure of FIG. 29 or 30. As shown, assume that the switch 189, FIG. 5, is in an ON state and allows total counter values to be automatically sent to the host machine 16, and that a predetermined reportable time has not expired after the set report date. Then, the control device 18 sends the total counter values stored in the memory B to the host machine 16. In the specific procedure, the reportable time is assumed to be 24 hours. Subsequently, the control device 18 determines whether or not the communication to the host machine 16 was successful. If the communication was not successful, e.g., when the host machine 16 did not respond, the control device 18 returns. If the communication was successful, the control device 18 resets a timer and then awaits the result of report from the host machine 16. In the specific procedure, 20 minutes set in the timer; if the control device 18 does not receive the result of report within 20 minutes, it returns. When the control device 18 receives the result of report within 20 minutes, it determines whether or not the result is acceptable. If the result is acceptable, the control device 18 sets the next date for reporting total counter values to the host machine 16, resets the total counter value transfer flag, and then returns; if otherwise, it simply returns.

On the other hand, when the switch 189 is in an OFF state or when the predetermined reportable time has expired after the set report date, the control device 18 sets the next date for reporting total counter values to the host machine 16, as when the report was successful. Then, the control device 18 resets the total counter transfer flag and returns.

Figure 34:
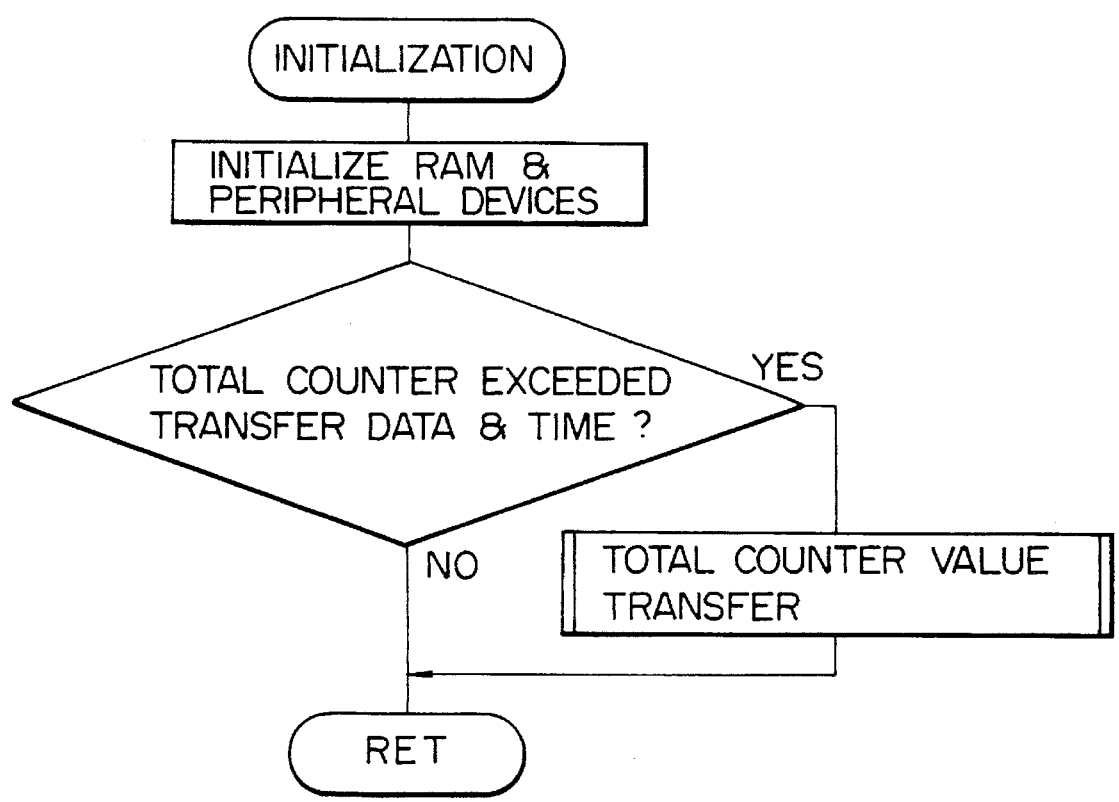
FIG. 34 is a flowchart representative of initialization executed by the communication control device.

FIG. 34 shows an initializing procedure to be executed by the control device 18. As shown, the control device 18 initializes the RAM and peripheral devices, determines whether or not the total counter value transfer date set therein has expired, and, if it has expired, executes the previously stated total counter value transfer processing.

Figure 35:
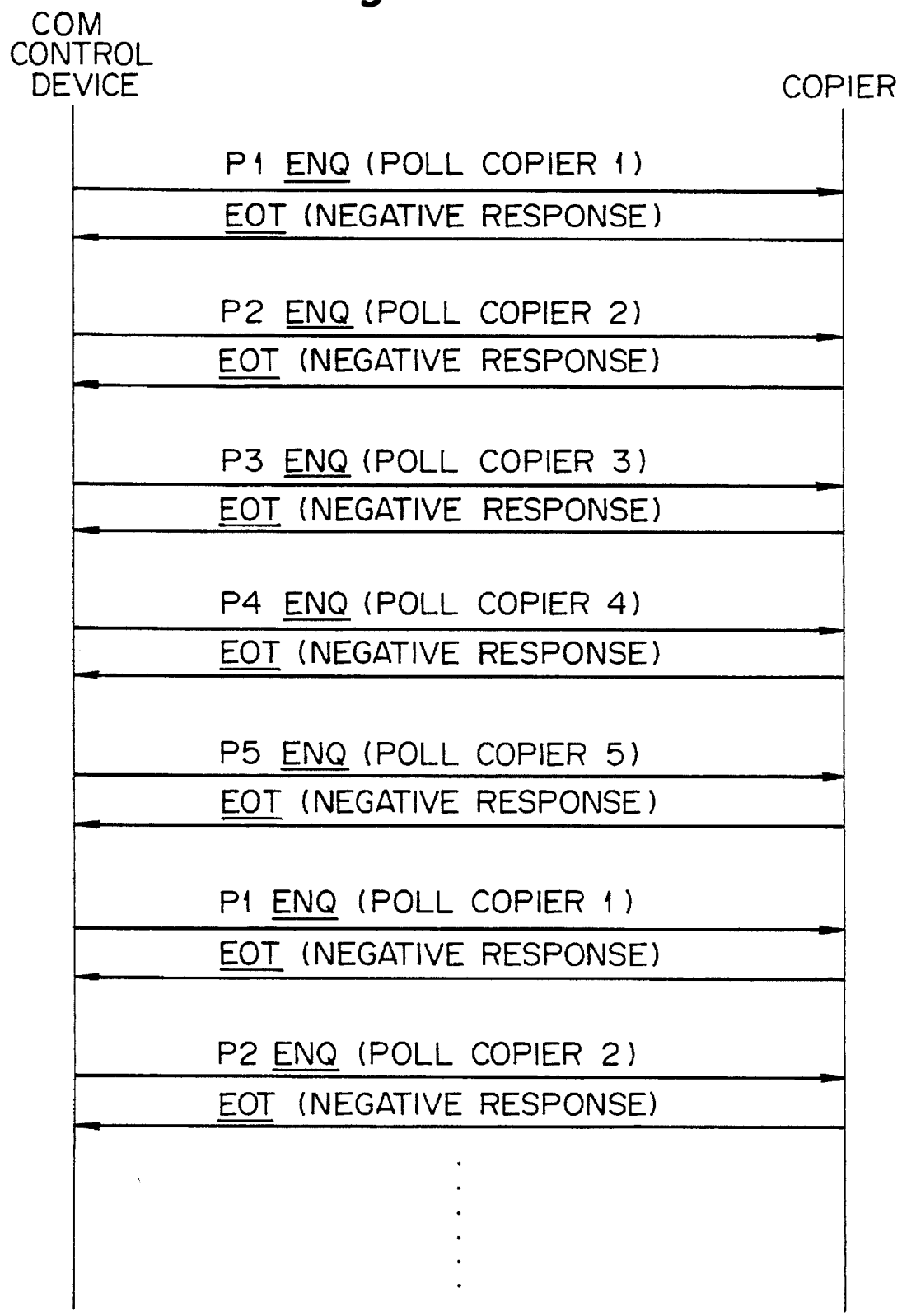
FIG. 35 shows a communication sequence in an idle state and particular to a case wherein five copiers are connected to the communication control device.

Hereinafter will be described a communication procedure between the control device 18 and the copiers 1. FIG. 35 shows a communication sequence in which five copiers 1 are connected to the control device 18, and the copiers 1 and device 18 are held in an idle state. As shown, the control device 18 executes a polling cycle for transmitting a polling sequence to the copiers 1 sequentially by use of the polling addresses of the copiers 1. When polled by its own address, the copier 1 sends a negative answer if a text to send is absent. Usually, the control device 1 repeats this polling cycle so long as the communication processing is not necessary.

Figure 36:
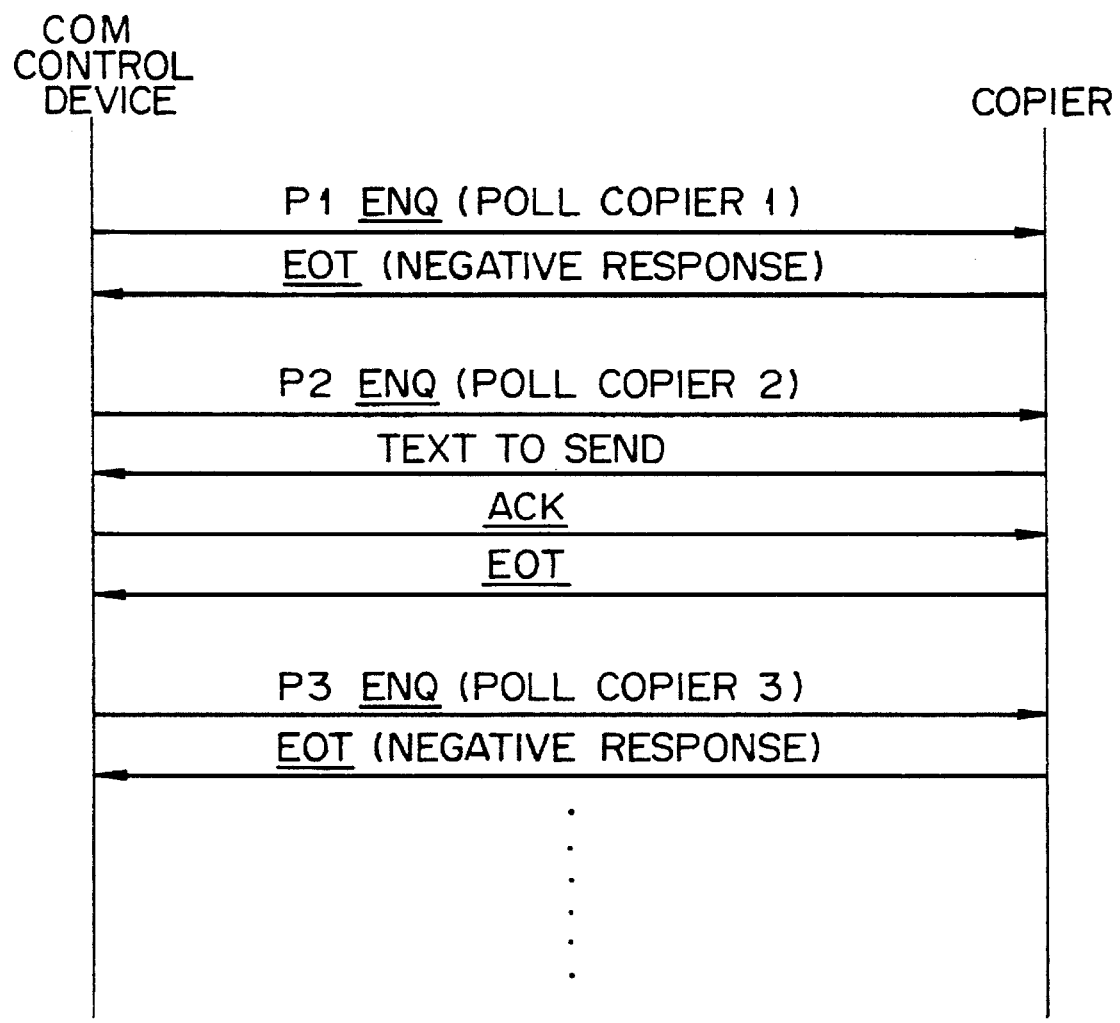
FIG. 36 shows a communication sequence in which a copier provided with an address 2 has a remote report text to send.

FIG. 36 shows a specific communication sequence in which a copier with an address 2 has a text to send by remote report. As shown, after the copier 2 has been addressed by its own address, it sends the text to the RS-485 line.

Figure 37:
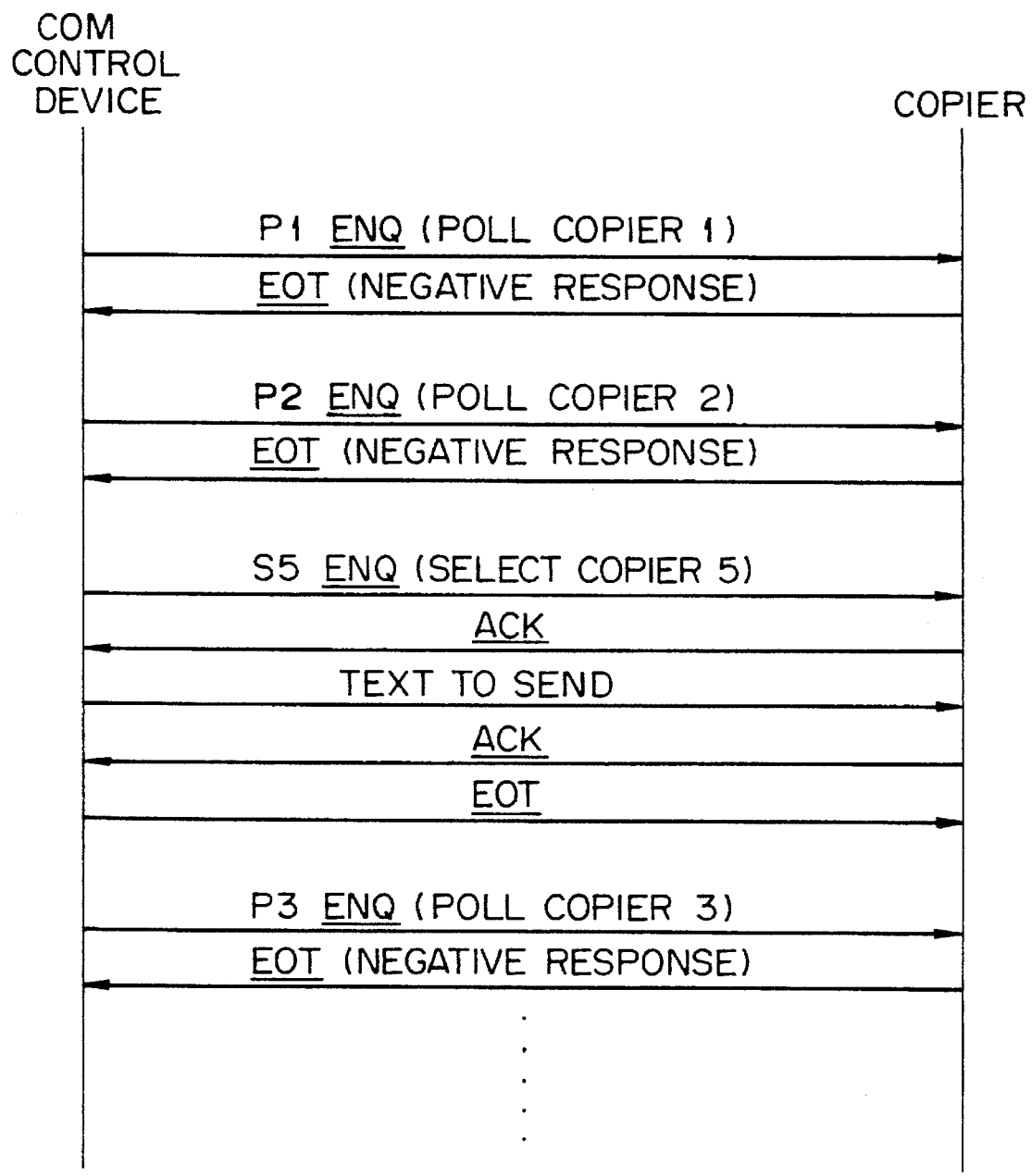
FIG. 37 shows a communication sequence in which the communication control device sends a text representative of the result of report to a copier designated by an address 5.

FIG. 37 shows a specific communication sequence in which the control device 18 sends a text representative of the result of report to a copier designated by an address 5. As shown, after completing polling under way, the control device 18 sends a selecting sequence to the copier 5 by using a selecting address assigned to the copier 5, sends the text to the copier 5, and then resumes the polling cycle.

Figure 38:
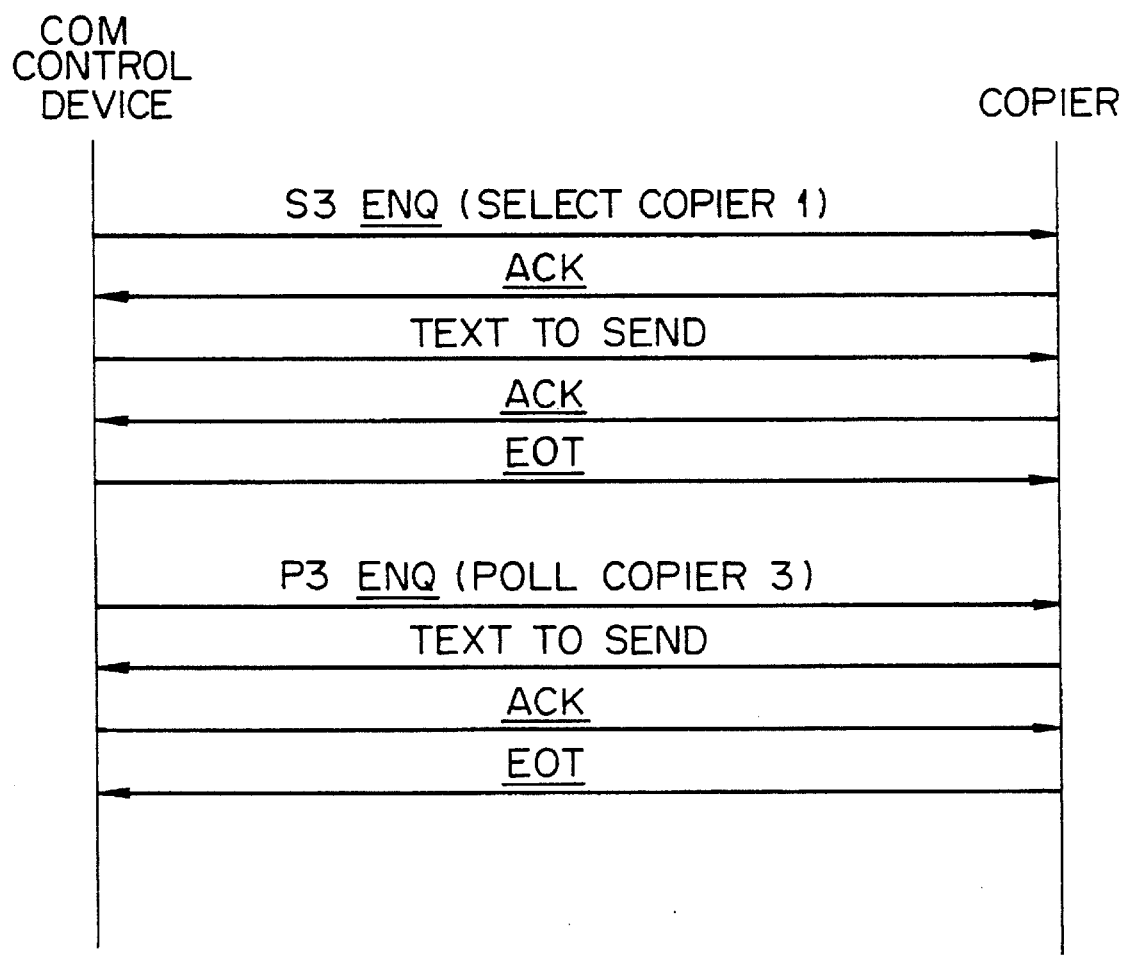
FIG. 38 shows a communication sequence between the communication control device and a copier with an address 3 to occur when the host machine of the control device accesses the copier.
Figure 39A:
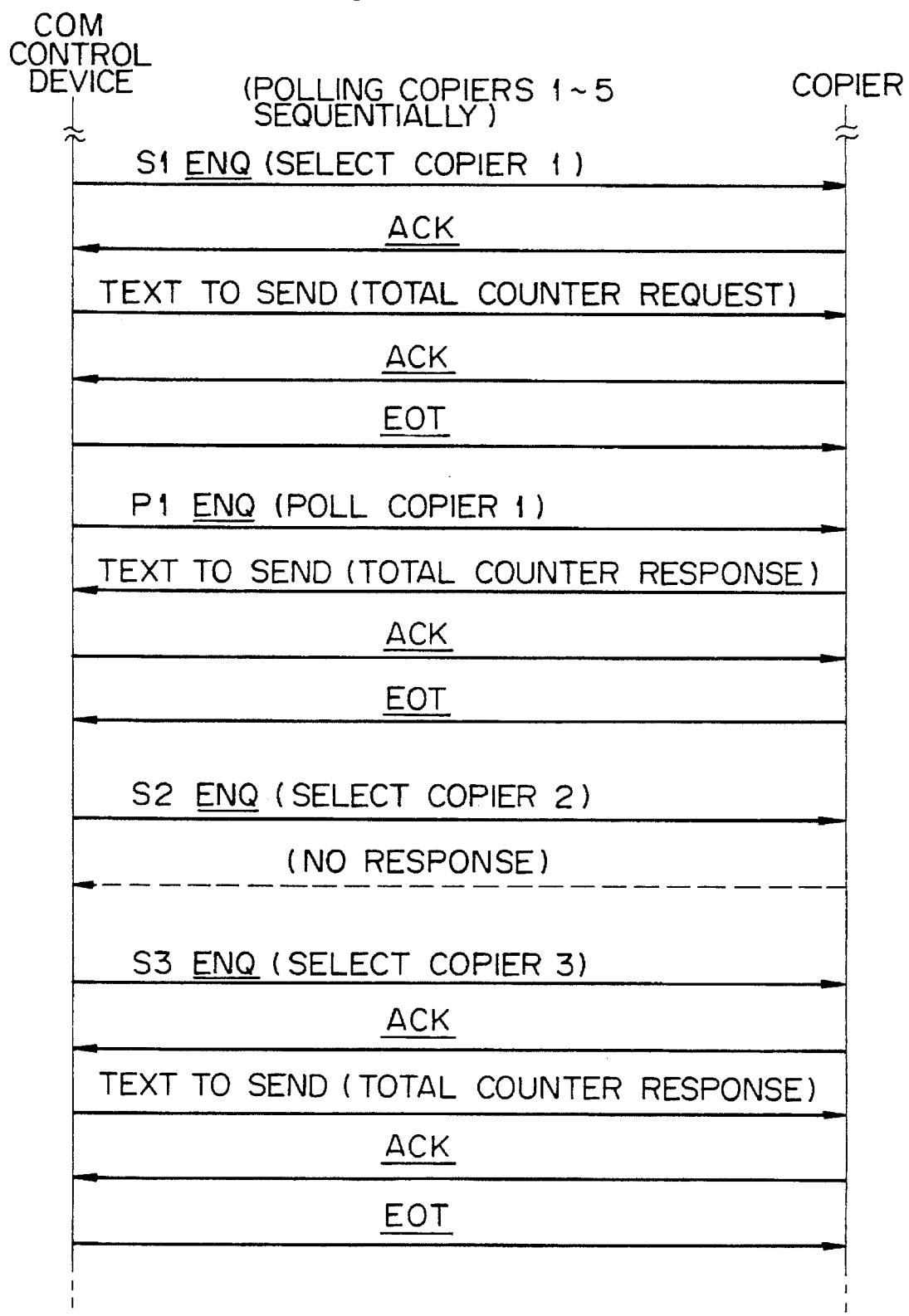
FIGS. 39 and 40 each show a particular communication sequence between the communication control device and the copiers to occur in the event of total counter value transfer which is performed periodically.
Figure 39B:
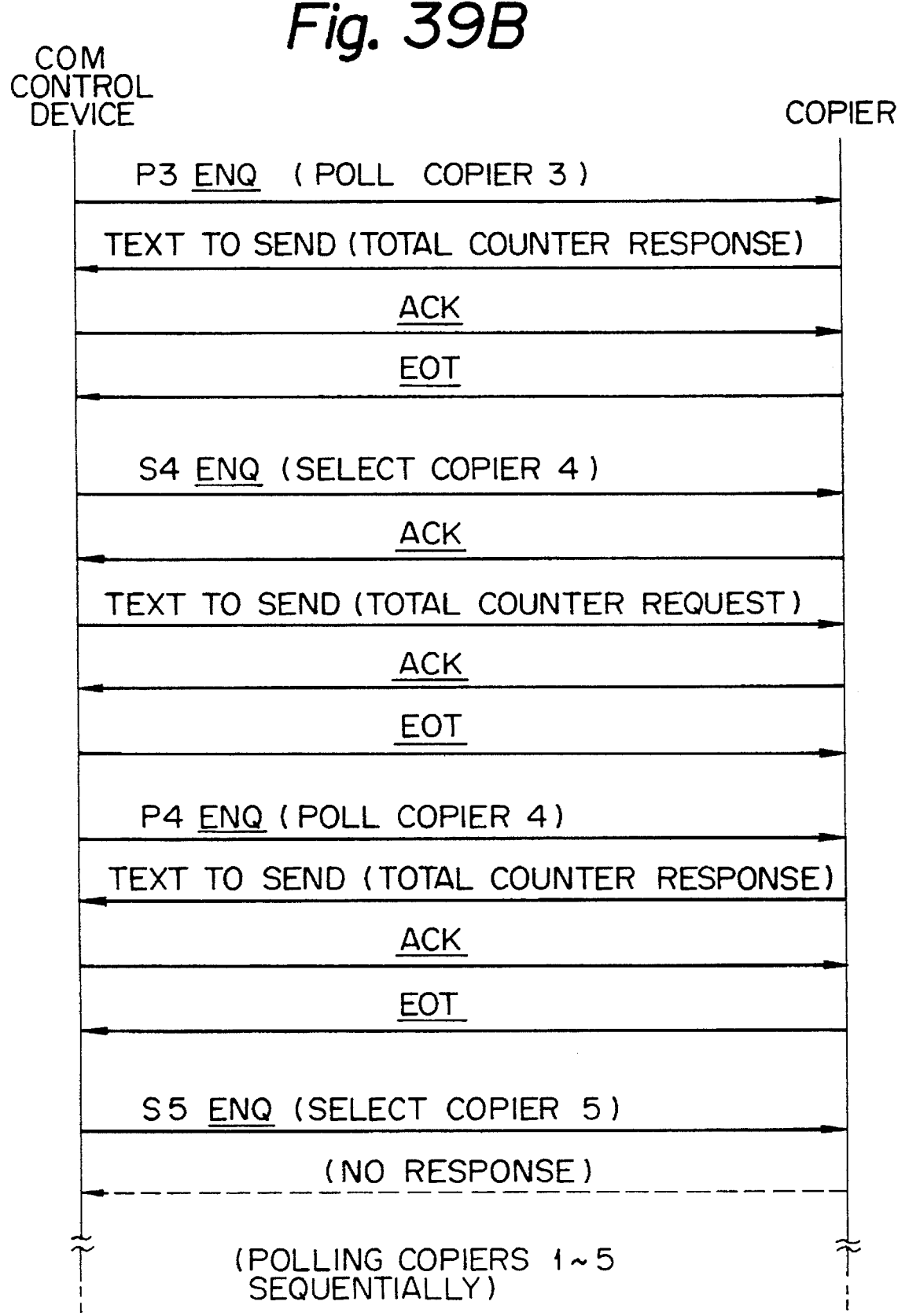
Figure 39C:
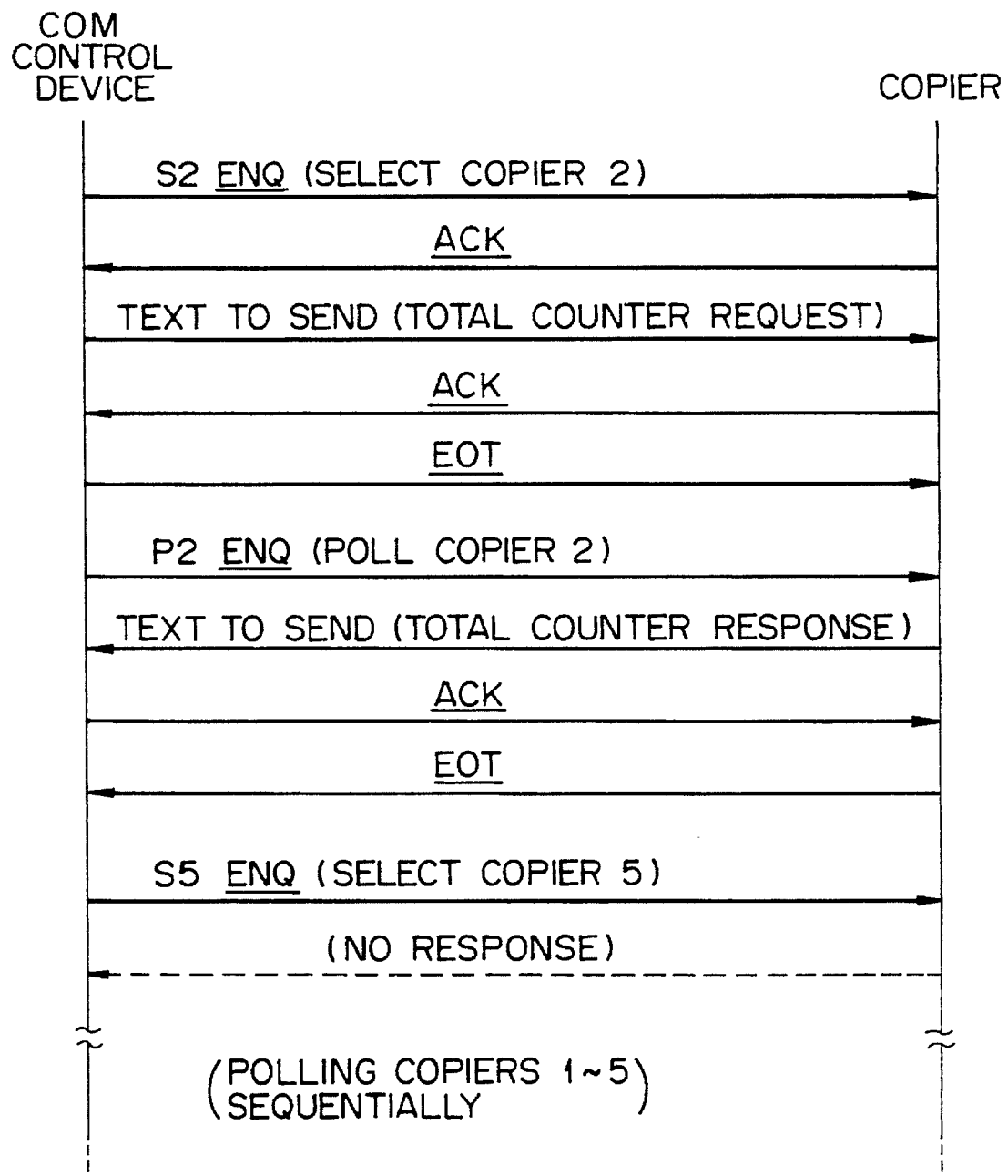
Figure 39D:
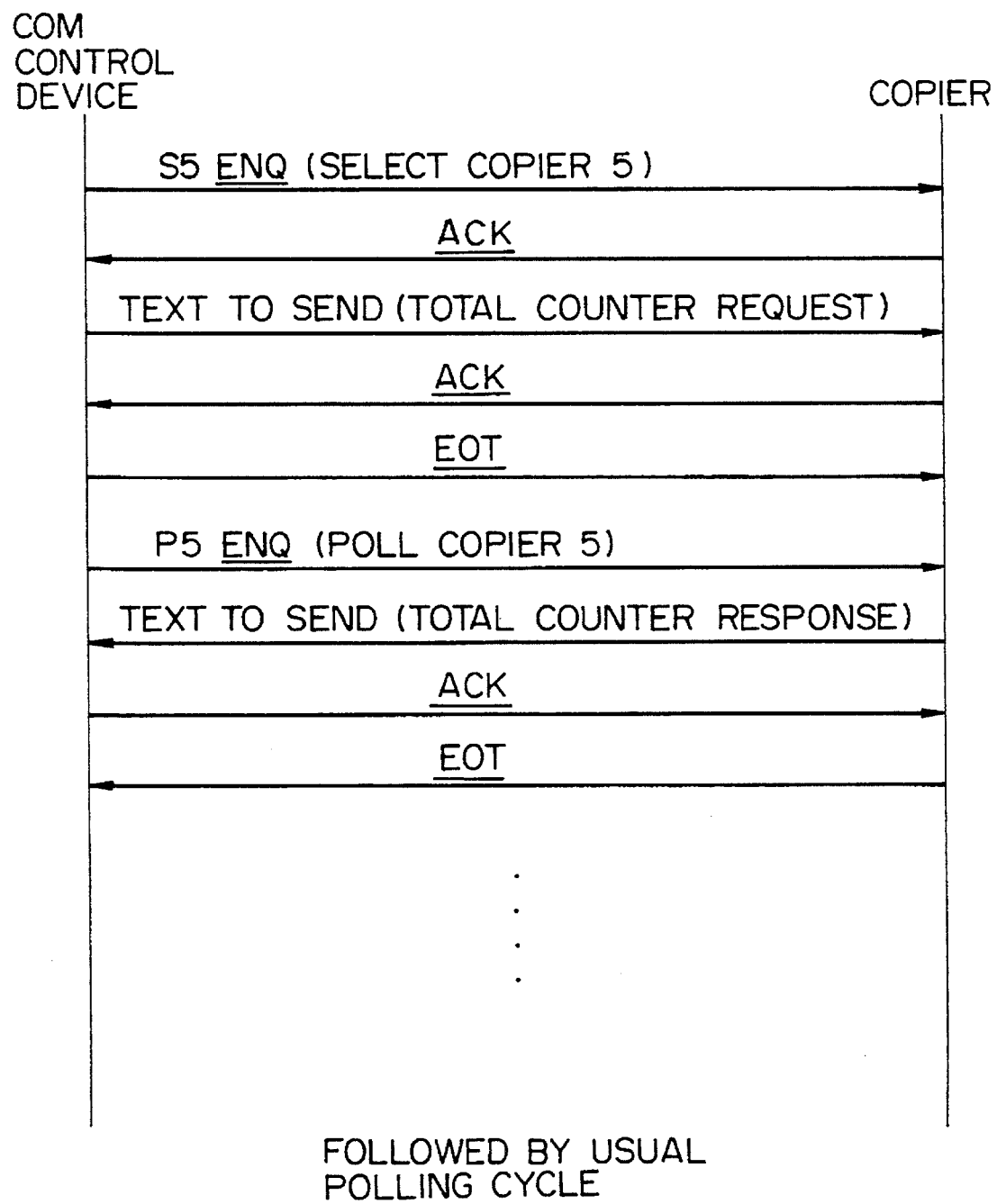
Figure 40A:
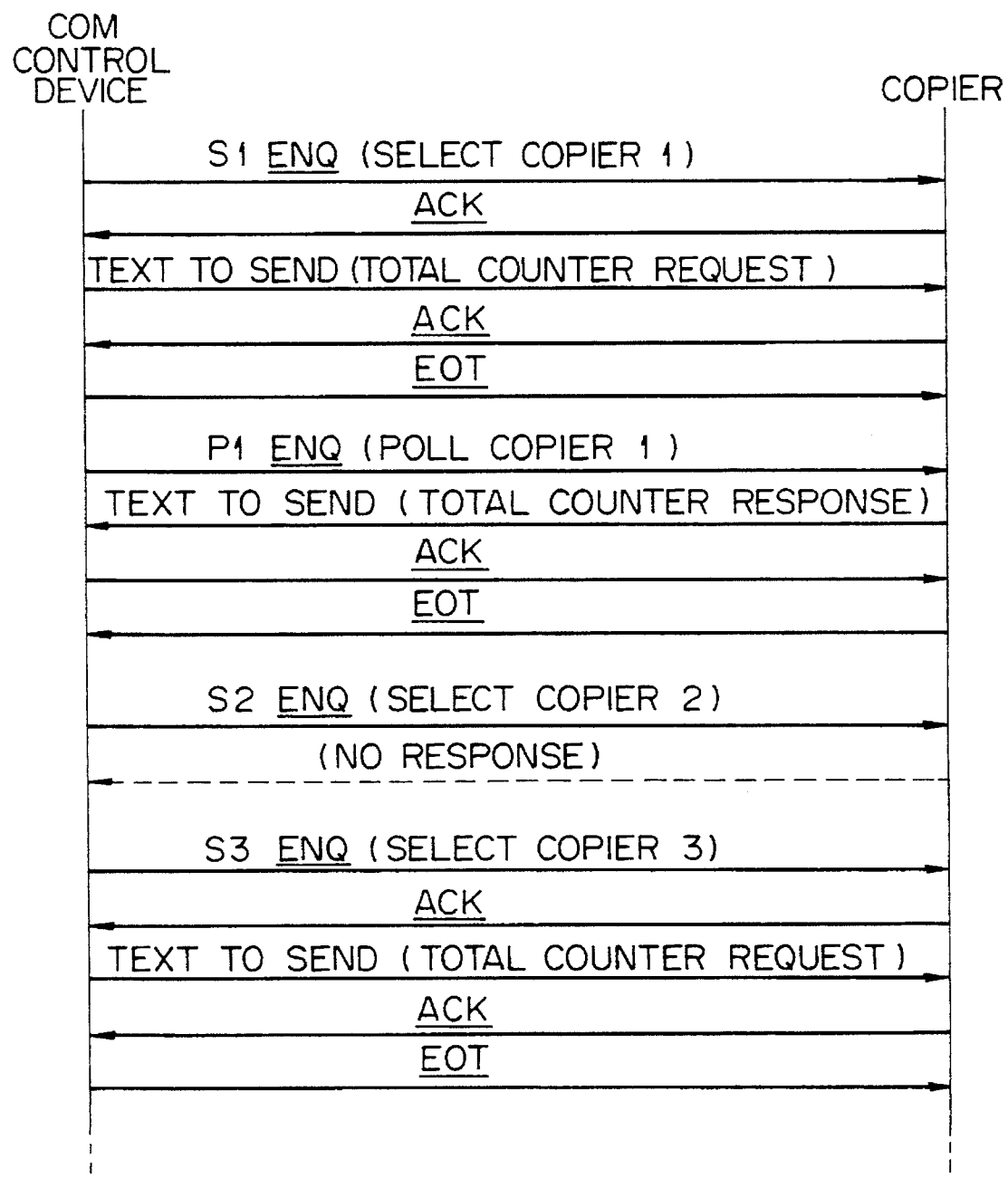
Figure 40B:
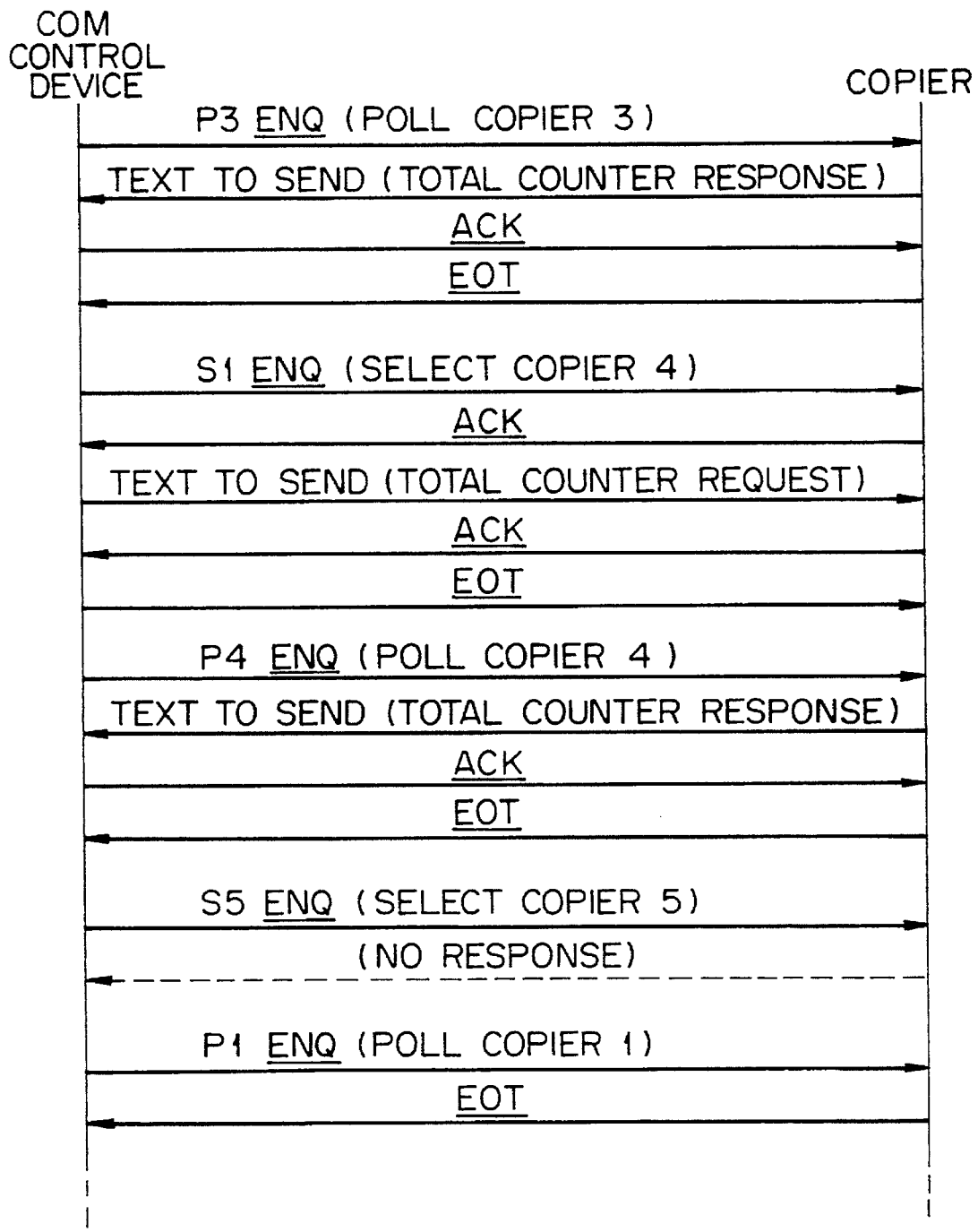
Figure 40C:
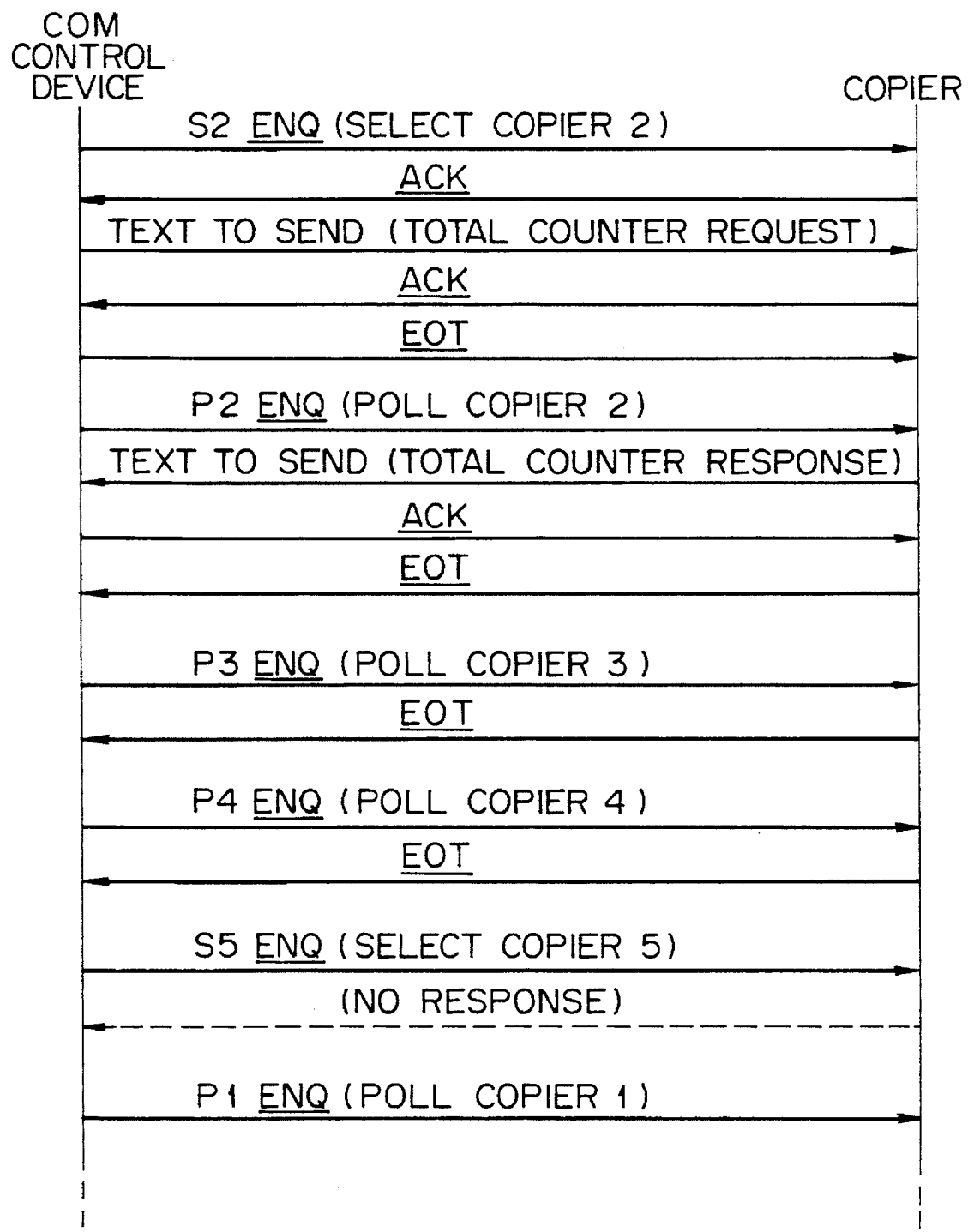
Figure 40D:
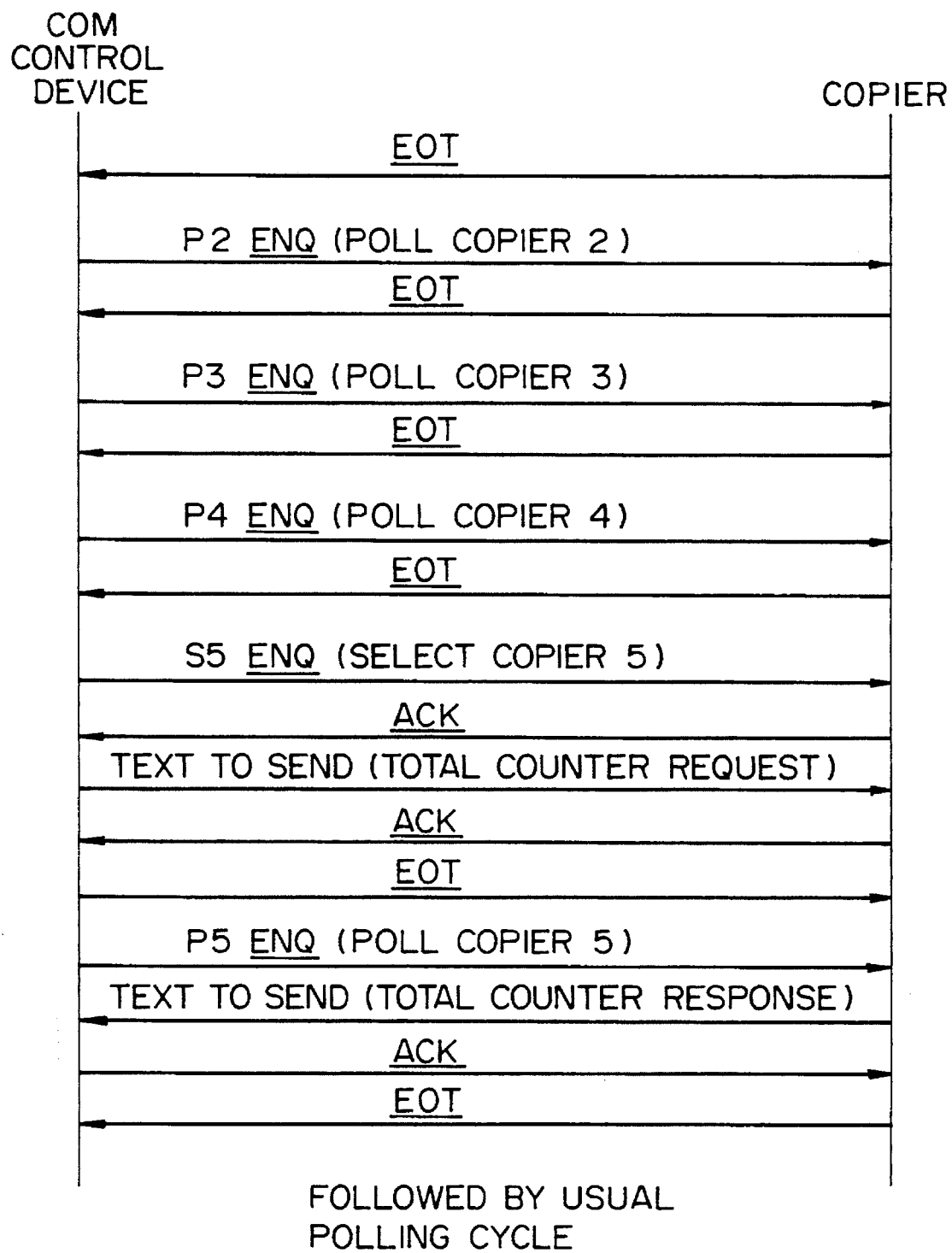

FIG. 38 shows a communication sequence between the control device 18 and a copier with an address 3 to occur when the device 18 accesses the copier 3. As shown, the control device 18 selects the copier 3, and then sends a text representative of a read request, write request or execute request to the copier 3. Just after the transmission of the text, the control device 18 polls the same copier 3 so as to receive a response to the request. In practice, the sequence of FIG. 37 is inserted in the polling cycle shown in FIG. 35.

FIG. 39 shows a specific communication sequence for implementing the periodic transfer of total counter values. As shown, when the date for collecting total counter values is reached, the control device 18 inserts in the polling cycle a selecting cycle for selecting the copiers with addresses 1–5 sequentially. When any one of the copiers 1–5 returns a response to the control device 18, the device 18 polls the same copier 1 immediately so as to receive data (total counter value). In the next selecting cycle, the control device 18 skips the copier 1 sent the data thereto. Specifically, in FIG. 39, the control device receives a response from the copiers 1, 3 and 4 in the first selecting cycle, and then selects the copiers 2 and 5 which failed to send data in the next selecting cycle. In the immediately following selecting cycle, the control device receives data from all the copiers 1–5 and then resumes the polling cycle shown in FIG. 35.

FIG. 40 shows another specific communication sequence for implementing the periodic transfer of total counter values. When the date for collecting total counter values is reached, the control device 18 selects the copiers 1–5 sequentially at the time when it would poll them in the procedure of FIG. 39, i.e., instead of polling them. When any one of the copiers 1–5 responds to the selection, the control device 18 polls it immediately to receive data. The first cycle to be executed with the copiers 1–5 just after the date for total counter value collection is the same as in the procedure of FIG. 39. However, the first cycle is not followed by a polling cycle. Specifically, in the second cycle, the control device 18 polls only the copiers sent data to the device 18 while selecting the other copiers to request them to send counter values. As soon as the control device 18 receives data from all the copiers 1–5, the device 8 restores the usual state in which it executes polling only. In the specific procedure, as in the procedure of FIG. 39, the control device 18 receives a response from the copiers 1, 3 and 4 first, receives data from, among the copiers which failed to send data, the copier 2 in the second cycle, and then successfully receives data from all the copiers 1–5 in the third cycle.

In summary, it will be seen that the present invention provides a communication control device having various unprecedented advantages, as enumerated below.

(1) Assume that particular data of an image forming apparatus and updated day by day should be read periodically. Then, even when the power supply to the image forming apparatus is shut off, a host machine can access the apparatus to read the data which should be read periodically, and receive it. In addition, the data can be preserved until the next time for reading. For example, the image forming apparatus sends data to the control device once a day, while the control device sends data to the host machine at the time for adding up data (usually once a month). Further, assume that the control device has only one memory, and that a trouble of the kind needing two days to remove has occurred while a communication for adding up data is held between the control device and the host machine. Then, since data after the add-up of the data is also continuously sent to the memory of the control device, the data before the add-up and the data after the add-up cannot be distinguished from each other and, therefore, cannot be added up with accuracy. In light of this, the control device is provided with first storing means for storing data received from the image forming apparatus, and second storing means for storing data to be sent to the host machine. With such two storing means, it is possible to distinguish the data before add-up and the data after add-up.

(2) The control device connects a line to the host machine automatically and sends data thereto. Hence, even when the power supply to the image forming apparatus is shut off, the host machine can receive particular data without accessing it. Furthermore, when a line is connected from the image forming apparatus, the control device can be connected even to a telephone set of the type unable to be accessed by the host machine directly due to the operator's extension switching.

(3) The control device can send particular data of individual image forming apparatuses to the host machine whenever needed. In addition, data reception is prevented from concentrating in a given period, so that reception can be executed systematically.

(4) Particular data can be surely transferred from the first storing means to the second storing means.

(5) Assume that the power supply to the image forming apparatus is not turned on on the date or the time when particular data should be transferred in the control device. Then, the control device transfers particular data received from the apparatus last time and sends them to the host machine. As a result, the data sent to the host machine is close to the data existing in the apparatus. For example, when the power supply to the apparatus is not turned on on the date for transferring particular data in the control device, the control device transfers particular data received last time and, therefore, sends data close to data on the transfer date to the host machine.

(6) Particular data can be surely sent from the second storing means to the host machine.

(7) The control device can surely determine if particular data is correct or not by reading the date or the time written from the host machine.

(8) When the control device calls the host machine to send particular data thereto, an occurrence that the line cannot be connected to the host machine due to the limited capacity of the host machine is reduced as far as possible. Hence, the host machine can execute receive processing systematically.

(9) When the power supply to the apparatus is turned on after the date or the time for the transfer of particular data has expired, particular data received last time is transferred from the first storing means to the second storing means. As a result, data close to data on the transfer date or transfer time is sent to the host machine, minimizing the error.

(10) The control device allows the host machine to read supervisory data, which should be read out for maintenance periodically, at a remote station without regard to the power supply to the apparatus.

(11) It is not necessary to install a plurality of control devices at each user's station. This successfully saves cost and space.

Various modifications will become possible for those skilled in the art after receiving the teachings of the present disclosure without departing from the scope thereof.

What is claimed is:

1. A communication control device formed as a single component unit connected between an image forming apparatus and a communication line in an image forming apparatus supervising system which connects said image forming apparatus and a host machine by said communication line, said device comprising:

particular data receiving means for receiving particular data from said image forming apparatus periodically;

first storing means for storing said particular data received by said particular data receiving means;

second storing means for storing said particular data transferred from said first storing means; and setting means for setting a date or a time for automatically transferring said particular data from said first storing means to said second storing means on the set date or time;

said device being capable of reading said particular data out of said second storing means when connected to said host machine via said communication line.

2. A device as claimed in claim 1, further comprising third storing means for storing the date or a time when said particular data is transferred from said first storing means to said second storing means.

3. A device as claimed in claim 1, wherein said particular data includes supervisory data for a maintenance contract of said image forming apparatus.

4. A device as claimed in claim 1, wherein a plurality of image forming apparatuses are connectable to said device, said device further comprising control means for controlling communications of said plurality of image forming apparatuses with said host machine via said communication line.

5. The communication control device according to claim 1, wherein data transferred from said first storing means to said second storing means is executed at substantially a same time as data transferred from said second storing means to said host machine.

6. A communication control device formed as a single component unit connected between an image forming apparatus and a communication line in an image forming apparatus supervising system which connects said image forming apparatus and a host machine by said communication line, said device comprising:

particular data receiving means for receiving particular data from said image forming apparatus periodically;

first storing means for storing said particular data received by said particular data receiving means;

second storing means for storing said particular data transferred from said first storing means;

transmitting means for sending said particular data stored in said second storing means to said host machine periodically; and setting means for setting a data or a time for automatically transferring said particular data from said first storing means to said second storing means on the set date or time.

7. A device as claimed in claim 6, further comprising third storing means for storing a date or a time when said particular data is transferred from said first storing means to said second storing means.

8. A device as claimed in claim 6, wherein said particular data include supervisory data for a maintenance contract.

9. A device as claimed in claim 6, wherein a plurality of image forming apparatuses are connectable to said device, said device further comprising control means for controlling communications of said plurality of image forming apparatuses with said host machine via said communication line.

10. The communication control device according to claim 6, wherein data transferred from said first storing means to said second storing means is executed at substantially a same time as data transferred from said second storing means to said host machine.

11. A device as claimed in claim 6, further comprising inhibiting means for inhibiting transfer of said particular data to said host machine on the elapse of a predetermined period of time after said date or said time for said transmitting means to send data to said host machine.

12. A communication control device formed as a single component unit connected between an image forming apparatus and a communication line in an image forming apparatus supervising system which connects said image forming apparatus and a host machine by said communication line, said device comprising:

particular data receiving means for receiving particular data from said image forming apparatus periodically;

first storing means for storing said particular data received by said particular data receiving means;

second storing means for storing said particular data transferred from said first storing means;

transmitting means for sending said particular data stored in said second storing means to said host machine periodically; and setting means for setting a date or a time for transferring said particular data from said first storing means to said second storing means;

wherein said particular data receiving means comprises means for receiving said particular data from said image forming apparatus during an interval between said date or said time for particular data transfer from said first storing means to said second storing means and a predetermined date or a predetermined time following said date or said time, said device further comprising transferring means for transferring said particular data stored in said first storing means to said second storing means immediately.

13. A device as claimed in claim 12, further comprising transferring means for transferring, when said particular data is not received from said image forming apparatus within an interval between said date or said time for particular data transfer from said first storing means to said second storing means and a predetermined date or a predetermined time following said date or said time, said particular data is transferred from said first storing means to said second storing means after said predetermined date or said predetermined time.

14. A device as claimed in claim 12, further comprising means for causing said particular data to be sent from said second storing means to said host machine when said particular data is transferred from said first storing means to said second storing means.

15. The communication control device according to claim 12, wherein data transferred from said first storing means to said second storing means is executed at substantially a same time as data transferred from said second storing means to said host machine.

16. A communication control device formed as a single component unit connected between an image forming apparatus and a communication line in an image forming apparatus supervising system which connects said image forming apparatus and a host machine by said communication line, said device comprising:

particular data receiving means for receiving particular data from said image forming apparatus periodically;

first storing means for storing said particular data received by said particular data receiving means;

second storing means for storing said particular data transferred from said first storing means;

transmitting means for sending said particular data stored in said second storing means to said host machine periodically;

setting means for setting a date or a time for transferring said particular data from said first storing means to said second storing means; and transferring means for transferring, at the beginning of an operation, said particular data from said first storing means to said second storing means if said date of said time for data transfer from said first storing means to said second storing means has elapsed.

17. The communication control device according to claim 16, wherein data transferred from said first storing means to said second storing means is executed at substantially a same time as data transferred from said second storing means to said host machine.

18. A communication control device formed as a single component unit connected between an image forming apparatus and a communication line in an image forming apparatus supervising system which connects said image forming apparatus and a host machine by said communication line, said communication control device comprising:

a communication interface connected to said image forming apparatus to receive particular data from said image forming apparatus;

a first memory connected to said communication interface to store said particular data from said communication interface; and a second memory connected between said first memory and said communication line to receive said particular data from said first memory and store said particular data;

said communication control device being capable of reading said particular data out of only said second memory when connected to said host machine via said communication line.

19. The communication control device according to claim 18, wherein data transferred from said first memory to said second memory is executed at substantially a same time as data transferred from said second memory to said host machine.

20. A communication control device formed as a single component unit connected between an image forming apparatus and a communication line in an image forming apparatus supervising system which connects said image forming apparatus and a host machine by said communication line, said communication control device comprising:

a communication interface connected to said image forming apparatus to receive particular data from said image forming apparatus periodically at first predetermined intervals;

a first memory connected to said communication interface to receive said particular data from said communication interface and store said particular data; and a second memory connected between said first memory and said communication line to receive said particular data from said first memory periodically at second predetermined intervals and store said particular data, said communication control device being capable of reading said particular data out of only said second memory periodically so as to send said particular data to said host machine via said communication line, said first predetermined interval being smaller than said second predetermined interval.

21. A communication control device according to claim 20, wherein an electric power supply for said communication control device is provided independently of an electric power supply for said image forming apparatus.

22. The communication control device according to claim 20, wherein data transferred from said first memory to said second memory is executed at substantially a same time as data transferred from said second memory to said host machine.

23. An image forming apparatus supervising system having an image forming apparatus and a host machine which are connected to each other, a communication line connecting said image forming apparatus and said host machine, and a communication control device formed as a single component unit connected between said image forming apparatus and said communication line, said communication control device comprising:

a communication interface connected to said image forming apparatus to receive particular data from said image forming apparatus;

a first memory connected to said communication interface to store said particular data from said communication interface; and a second memory connected between said first memory and said communication line to receive said particular data from said first memory and store said particular data;

said communication control device being capable of reading said particular data out of only said second memory when connected to said host machine via said communication line.

24. The communication control device according to claim 23, wherein data transferred from said first memory to said second memory is executed at substantially a same time as data transferred from said second memory to said host machine.

25. An image forming apparatus supervising system having an image forming apparatus and a host machine which are connected to each other, a communication line connecting said image forming apparatus and said host machine, and a communication control device formed as a single component unit connected between said image forming apparatus and said communication line, said communication control device comprising:

a communication interface connected to said image forming apparatus to receive particular data from said image forming apparatus periodically at first predetermined intervals;

a first memory connected to said communication interface to receive said particular data from said communication interface and store said particular data; and a second memory connected between said first memory and said communication line to receive said particular data from said first memory periodically at second predetermined intervals and store said particular data;

said communication control device being capable of reading said particular data out of only said second memory periodically so as to send said particular data to said host machine via said communication line, said first predetermined interval being smaller than said second predetermined interval.

26. The communication control device according to claim 25, wherein data transferred from said first memory to said second memory is executed at substantially a same time as data transferred from said second memory to said host machine.

27. An image forming apparatus supervising system having an image forming apparatus and a host machine which are connected to each other, a communication line connecting said image forming apparatus and said host machine, and a communication control device formed as a single component unit connected between said image forming apparatus and said communication line, said communication control device comprising:

particular data receiving means for receiving particular data from said image forming apparatus periodically;

first storing means for storing said particular data received by said particular data receiving means;

second storing means for storing said particular data received by said particular data receiving means; and setting means for setting a data or a time for automatically transferring said particular data from said first storing means to said second storing means on the set data or time, said communication control device being capable of reading said particular data out of said second storing means when connected to said host machine via said communication line.

28. The communication control device according to claim 27, wherein data transferred from said first storing means to said second storing means is executed at substantially a same time as data transferred from said second storing means to said host machine.

29. A communication control device formed as a single component unit connected between an image forming apparatus and a communication line in an image forming apparatus supervising system which connects said image forming apparatus and a host machine by said communication line, said device comprising:

- a communication interface connected to said image forming apparatus to receive particular data from said image forming apparatus periodically;
- a first memory to store said particular data received by said communication interface;
- a second memory to store said particular data transferred from said first memory; and
- a setting unit setting a date or a time for automatically transferring said particular data from said first memory to said second memory on the set date or time;
- said device being capable of reading said particular data out of said second memory when connected to said host machine via said communication line.

30. The communication control device according to claim 29, wherein data transferred from said first memory to said second memory is executed at substantially a same time as data transferred from said second memory to said host machine.

31. A communication control device formed as a single component unit connected between an image forming apparatus and a communication line in an image forming apparatus supervising system which connects said image forming apparatus and a host machine by said communication line, said device comprising:

- a communication interface connected to said image forming apparatus to receive particular data from said image forming apparatus periodically;
- a first memory to store said particular data received by said communication interface;
- a second memory to store said particular data transferred from said first memory;
- a transmitter for sending said particular data stored in said second memory to said host machine periodically; and
- a setting unit setting a data or a time for automatically transferring said particular data from said first memory to said second memory on the set date or time.

32. The communication control device according to claim 31, wherein data transferred from said first memory to said second memory is executed at substantially a same time as data transferred from said second memory to said host machine.

33. A communication control device formed as a single component unit connected between an image forming apparatus and a communication line in an image forming apparatus supervising system which connects said image forming apparatus and a host machine by said communication line, said device comprising:

- a communication interface connected to said image forming apparatus to receive particular data from said image forming apparatus periodically;
- a first memory to store said particular data received by said communication interface;
- a second memory to store said particular data transferred from said first memory;
- a transmitter for sending said particular data stored in said second memory to said host machine periodically;
- a setting unit setting a date or a time for transferring said particular data from said first memory to said second memory; and
- a transferring unit transferring, at the beginning of an operation, said particular data from said first memory to said second memory if said date or said time for data transfer from said first memory to said second memory has elapsed.

34. The communication control device according to claim 33, wherein data transferred from said first memory to said second memory is executed at substantially a same time as data transferred from said second memory to said host machine.

* * * * *